United States Patent
Taniguchi

(10) Patent No.: US 7,286,081 B2
(45) Date of Patent: Oct. 23, 2007

(54) ACQUISITION ASSIST INFORMATION MANAGING SYSTEM, ACQUISITION ASSIST INFORMATION MANAGING DEVICE, AND ACQUISITION ASSIST INFORMATION MANAGING METHOD

(75) Inventor: Hideki Taniguchi, Nogano-ken (JP)

(73) Assignee: Seiko Epson Corporation, Tokyo (JP)

( * ) Notice: Subject to any disclaimer, the term of this patent is extended or adjusted under 35 U.S.C. 154(b) by 204 days.

(21) Appl. No.: 11/037,455

(22) Filed: Jan. 19, 2005

(65) Prior Publication Data
US 2005/0179589 A1 Aug. 18, 2005

(30) Foreign Application Priority Data
Jan. 21, 2004 (JP) ............................. 2004-013197
Jan. 18, 2005 (JP) ............................. 2005-009953

(51) Int. Cl.
*G01S 1/00* (2006.01)
*H04B 7/185* (2006.01)
(52) U.S. Cl. ............................................... 342/357.02
(58) Field of Classification Search ..... 342/357.01–15, 342/76
See application file for complete search history.

(56) References Cited

U.S. PATENT DOCUMENTS 6,992,617 B2 * 1/2006 Diggelen et al. ...... 342/357.02
2002/0082774 A1   6/2002 Bloebaum
2002/0145560 A1  10/2002 Tsujimoto et al.
2003/0011511 A1   1/2003 King et al.
2003/0069692 A1 * 4/2003 Krasner et al. ............. 701/213
2003/0210656 A1  11/2003 Biacs et al.

FOREIGN PATENT DOCUMENTS

JP         2002196063 A    7/2002

* cited by examiner

*Primary Examiner*—Thomas H. Tarcza
*Assistant Examiner*—Nga X. Nguyen
(74) *Attorney, Agent, or Firm*—Global IP Counselors, LLP

(57) ABSTRACT

An acquisition assist information managing system 1 is provided with the following to enable user equipment to perform positioning by acquiring a satellite. A test positioning device 254 performs test positioning by repetitively acquiring a satellite 3 with the use of combinations of respective items of information. An evaluation information generating device 255 generates evaluation information by evaluating respective results of test positioning performed by acquiring the satellite 3 with the use of combinations of respective items of information. A combination specifying device 255 specifies a combination of respective items of information that can reach a numerical target 112 related to positioning from user equipment 100. An acquisition assist information providing device 257 provides the user equipment 100 with acquisition assist information 222 including the specified combination of respective items of information.

14 Claims, 13 Drawing Sheets

DATA SIZE OF EACH PIECE OF ASSIST DATA

| ASSIST DATA | UPDATE CYCLE | VALID PERIOD | DATA SIZE | REMARKS |
|---|---|---|---|---|
| TIME | — | — | 31 BYTES | EXACT TIME SHOULD BE OBTAINED AT THE TIME OF POSITIONING |
| INITIAL LOCATION | — | — | 15 BYTES | WITHIN A RANGE OF 150 Km FROM LOCATION AT THE TIME OF POSITIONING IS PREFERRED |
| EPHEMERIS | 1h | 2h | 75 BYTES x NUMBER OF SATELLITES (UP TO 32) | ASSUMED AS VALID FOR ABOUT 4 HOURS |
| ALMANAC | IRREGULAR | ABOUT 2.8 DAYS | 1 + 26 x NUMBER OF SATELLITES (UP TO 32) | ASSUMED AS VALID FOR ABOUT 1 MONTH |
| IONOSPHERIC CORRECTION VALUE | — | — | 8 BYTES | ACCURACY IS IMPROVED WHEN OBTAINED |
| DGPS CORRECTION VALUE | — | — | 4 + 10 x NUMBER OF SATELLITES (UP TO 32) | LATEST DATA IS NEEDED FOR EACH POSITIONING (FOR DIFFERENTIAL POSITIONING ONLY) |

FIG. 6

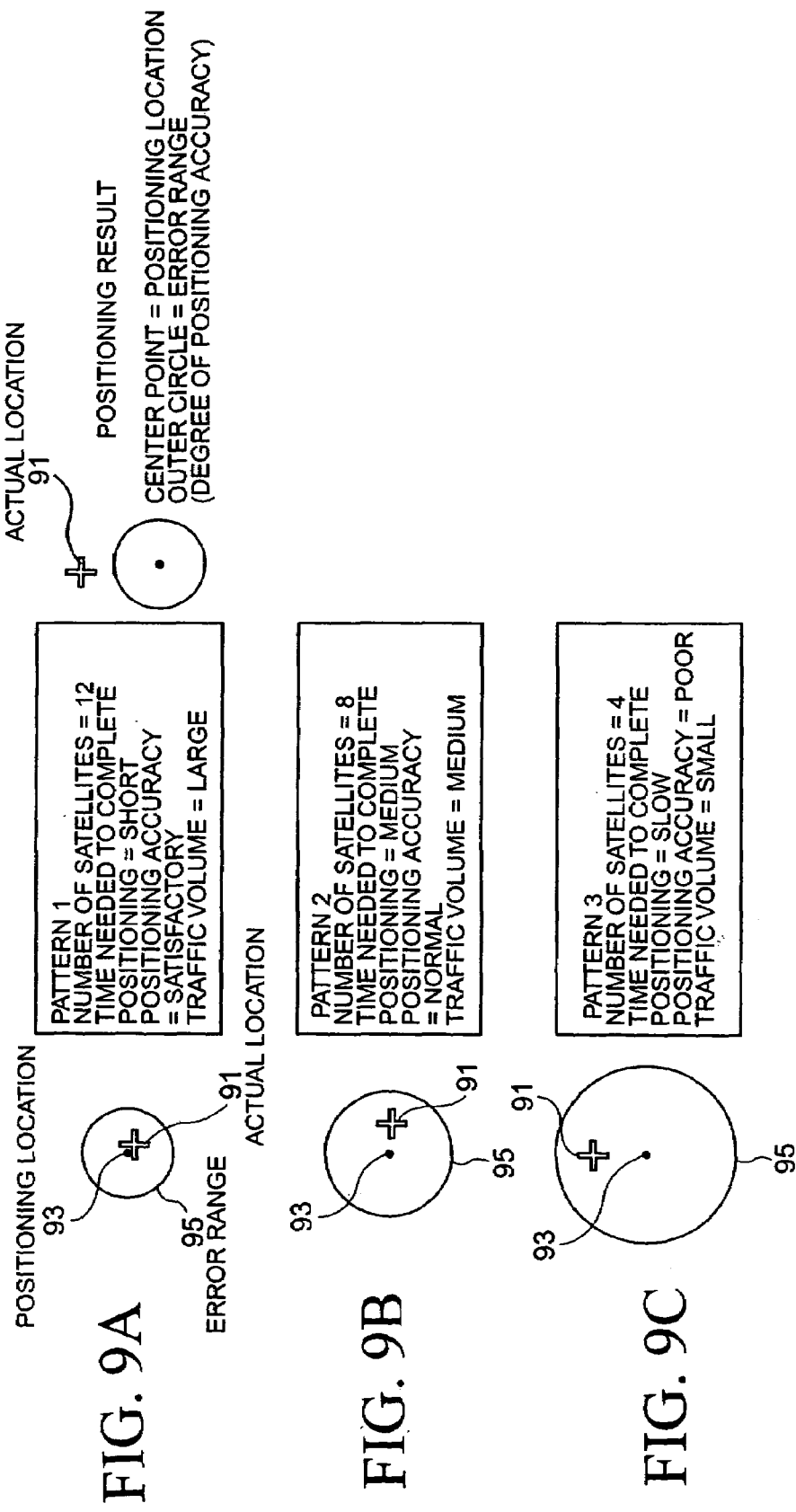

FIG. 10A

RELATION AMONG NUMBER OF SATELLITES IN EPHEMERIS, POSITIONING ACCURACY, AND TIME NEEDED TO COMPLETE POSITIONING

| COMBINATION | NUMBER OF SATELLITES (DATA SIZE) | POSITIONING ACCURACY (METERS) | TIME NEEDED TO COMPLETE POSITIONING (S) |
|---|---|---|---|
| 1 | 4(300 BYTES) | 40 | 10 |
| 2 | 8(600 BYTES) | 20 | 20 |
| 3 | 12(900 BYTES) | 8 | 30 |

FIG. 10B

RANKING RESULTS OF RELATION AMONG NUMBER OF SATELLITES IN EPHEMERIS, POSITIONING ACCURACY, AND TIME NEEDED TO COMPLETE POSITIONING

| COMBINATION | NUMBER OF SATELLITES (DATA SIZE) | RANK | POSITIONING ACCURACY (METERS) | RANK | TIME NEEDED TO COMPLETE POSITIONING (S) | RANK |
|---|---|---|---|---|---|---|
| 1 | 4(300 BYTES) | A | 40 | D | 40 | D |
| 2 | 8(600 BYTES) | C | 12 | B | 15 | B |
| 3 | 12(900 BYTES) | D | 8 | A | 10 | A |

ACQUISITION ASSIST INFORMATION MANAGING SYSTEM, ACQUISITION ASSIST INFORMATION MANAGING DEVICE, AND ACQUISITION ASSIST INFORMATION MANAGING METHOD

BACKGROUND OF THE INVENTION

1. Field of the Invention

The present invention generally relates to an acquisition assist information managing system. More specifically, the present invention relates to an acquisition assist information managing system, an acquisition assist information managing device, and an acquisition assist information managing method, each provided with user equipment and an acquisition assist information providing server. The user equipment performs positioning by acquiring a satellite link with the use of acquisition assist information, and then receives the satellite radio waves from the acquired satellite. The acquisition assist information providing server provides the acquisition assist information. Assist information is information to assist the acquisition of a satellite that outputs satellite radio waves and includes plural items of information.

2. Background Information

Recently, developments have been under way for electronic equipment, such as a mobile phone, to be compliant with so-called 3GPP (Third Generation Partnership Project) standards. The previously present network assist type GPS (Global Positioning System) is adopted for these so-called 3GPP (Third Generation Partnership Project) standards as well. The network assist type GPS positioning system schematically includes mobile user equipment, a computer in a radio network control, and an assist data providing server installed in a satellite access station. The user equipment, computer in the radio network control, and assist data providing server are interconnected to each other via a base station and a network.

The user equipment is configured to perform positioning, for example, by means of a GPS (Global Positioning System). The user equipment acquires a satellite with the use of assist data prior to actual positioning. The radio network control accepts a request for assist data from the user equipment and then makes a request for the assist data to the assist data providing server.

Meanwhile, the assist data providing server manages assist data used to assist the acquisition of a satellite link (hereinafter acquisition of or acquiring a satellite), and it is configured to provide the user equipment with the assist data by way of the radio network control in response to the request from the user equipment. The assist data are acquisition assist information to assist the user equipment when performing positioning as described above by making it easier to acquire a satellite, and they include at least one item of information.

Conventionally, respective items of information in the assist data are selected, for example, by the assist data providing server at the end to provide the assist data. To be more specific, examples of respective items of information in the assist data include the time, the initial location, the ephemeris, the almanac, an ionospheric correction value, and a DGPS correction value.

As has been described, the user equipment in the related art first makes a request for assist data to the assist data providing server, and obtains the assist data from the assist data providing server as has been described prior to the acquisition of the satellite. The assist data include at least one item of information as has been described, and the user equipment is configured to acquire the satellite with the use of all the items of information included in the obtained assist data. For example, when two cases of acquiring four satellites are concerned, it is typical for the user equipment that an acquisition time to acquire four satellites becomes shorter by obtaining assist data that include more kinds of items of information, while the data size of the assist data itself becomes larger as the kinds of items of information included in the assist data are increased.

Incidentally, in general, numerical targets related to the positioning that each operator desires, such as the positioning accuracy and the positioning time, are different from user equipment to user equipment. For example, when positioning is performed simply with the use of the user equipment, it is preferable for the operator that a time needed to complete the positioning is shorter even though the positioning is less accurate. A time needed to complete the positioning referred to herein includes an acquisition time of a satellite, and a positioning time, which is a time needed for actual positioning. Meanwhile, for example, when positioning is performed in detail with the use of the user equipment, a higher degree of positioning accuracy is desired even when it takes longer to complete the positioning.

When the operator wishes to perform positioning using the user equipment in the related art, for example, a system has been disclosed in which positioning is performed for the desired positioning accuracy or within a desired positioning time, by switching positioning modes per se, such as a base station information using mode to perform positioning with the use of information of the base station, and a so-called stand-alone GPS positioning mode, as shown in Japanese Patent Publication JP-A-2002-196063, which is hereby incorporated by reference.

The user equipment in the related art that changes the positioning modes, however, needs time for a switching judging process to switch the positioning modes prior to actual positioning. Hence, the user equipment in the related art cannot shorten the time needed to complete the positioning including such a switching judging process, which makes it difficult to configure the user equipment to reach a desired numerical target related to positioning.

Meanwhile, the user equipment in the related art that does not change the positioning modes acquires a satellite using items of information that are not essentially necessary but included in the assist data obtained from the assist data providing server. This raises a problem in that the positioning is not performed in a way to reach the numerical target related to positioning that the operator of the user equipment desires, such as the time, including the acquisition time, needed to complete the positioning and the positioning accuracy.

To be more specific, for example, when it is sufficient to acquire a satellite at a high speed and the positioning accuracy is not required as has been described, there is no need to use assist data including items of information that can increase the positioning accuracy. This is because of the fact that the items of information in the assist data do not match with the acquisition time or the positioning accuracy that the operator of the user equipment desires.

It may seem possible to acquire a satellite by selecting parts of items of information instead of acquiring a satellite with the use of all the items of information included in the assist data. This alternative, however, is infeasible because processing time becomes too long when the processing ability of the user equipment is considered.

Hence, the user equipment in the related art has a problem in that when it performs positioning by acquiring a satellite with the use of all the items of information in the assist data obtained from the assist data providing server, it fails to perform the positioning within a desired time, including an acquisition time, needed to complete the positioning with the desired positioning accuracy.

In view of the above, it will be apparent to those skilled in the art from this disclosure that there exists a need for an improved acquisition assist information managing system, acquisition assist information managing device, and acquisition assist information managing method. This invention addresses this need in the art as well as other needs, which will become apparent to those skilled in the art from this disclosure.

SUMMARY OF THE INVENTION

It is therefore an object of the invention to provide an acquisition assist information managing system, an acquisition assist information managing device, and an acquisition assist information managing method that solve the problems discussed above and thereby enable the user equipment to perform positioning by acquiring a satellite with the use of acquisition assist information while reaching a desired numerical target related to positioning.

The above object is realized by a first aspect of the present invention that provides an acquisition assist information managing system, which includes user equipment, an acquisition assist information providing server, and an acquisition assist information server. The user equipment performs positioning by acquiring a satellite with the use of acquisition assist information, and then receiving satellite radio waves from the acquired satellite. Acquisition assist information is information to assist acquisition of a satellite that outputs satellite radio waves and includes plural items of information. The acquisition assist information providing server provides the acquisition assist information. The acquisition assist information evaluation server evaluates the acquisition assist information between the acquisition assist information providing server and the user equipment. The user equipment includes an acquisition assist information requesting device. The acquisition assist information requesting device makes a request for the acquisition assist information to the acquisition assist information evaluation server by setting a numerical target related to positioning. The acquisition assist information evaluation server includes an acquisition assist information request accepting device, an acquisition assist information obtaining device, a combination generating device, a test positioning device, an evaluation information generating device, a combination specifying device, and an acquisition assist information providing device. The acquisition assist information request accepting device accepts the request for the acquisition assist information from the user equipment. The acquisition assist information obtaining device makes a request for the acquisition assist information to the acquisition assist information providing server, and thereby obtains the acquisition assist information including the plural items of information from the acquisition assist information providing server. The combination generating device generates combinations of respective items of information included in the obtained acquisition assist information. The test positioning device performs test positioning by repetitively acquiring the satellite with the use of the combinations of respective items of information. The evaluation information generating device generates evaluation information by evaluating respective results of test positioning performed by acquiring the satellite with the use of the combinations of respective items of information. The combination specifying device specifies, on the basis of the evaluation information, a combination of respective items of information capable of reaching the numerical target related to positioning from the user equipment. The acquisition assist information providing device provides the user equipment with the acquisition assist information including the specified combination of respective items of information.

According to this configuration, since the acquisition assist information evaluation server includes the combination generating device, the test positioning device, the evaluation information generating device, and the combination specifying device, the evaluation information generating device generates the evaluation information for the results of the test performed by acquiring the satellite with the use of combinations of respective items of information included in the acquisition assist information. Further, the combination specifying device specifies, on the basis of the evaluation information, a combination of respective items of information that matches with the request from the user equipment in which the numerical target related to positioning is set. The acquisition assist information providing device then places the respective items of information that match with the request from the user equipment into the acquisition assist information, and transmits the resulting acquisition assist information to the user equipment.

The combination of plural items of information included in the acquisition assist information that has been transmitted to the user equipment matches with the request from the user equipment, and therefore is the one to enable the numerical target related to positioning by the user equipment to be reached. Hence, when the user equipment acquires the satellite with the use of the acquisition assist information including the combination of respective items of information thus specified, and performs positioning with the use of satellite radio waves received from the acquired satellite, the numerical target related to positioning becomes close to the request from the user equipment. The user equipment is thus able to perform positioning by acquiring the satellite with the use of the acquisition assist information while reaching a desired numerical target related to positioning.

An acquisition assist information managing system in accordance with a second aspect of the present invention is the system of the first aspect, further including a relay server. The relay server relays the acquisition assist information between the acquisition assist information providing server and the acquisition assist information evaluation server. The relay server includes a valid period managing device, a request accepting device, an acquisition assist information storage device, a valid period confirming device, and an acquisition assist information transmitting device. The valid period managing device manages a valid period, during which the acquisition assist information is valid for assisting acquisition of the satellite, for each piece of the acquisition assist information. The request accepting device accepts the request for the acquisition assist information from the acquisition assist information evaluation server. The acquisition assist information storage device stores the obtained acquisition assist information when the acquisition assist information that has been obtained from the acquisition assist information providing server is present. The valid period confirming device confirms whether an obtainment time of the acquisition assist information that matches with the request from the acquisition assist information evaluation server is within the valid period of the acquisition assist information. The acquisition assist information transmitting device transmits to the acquisition assist information evaluation server the obtained acquisition assist information stored in the acquisition assist information storage device when the obtainment time of the acquisition assist information is judged as being within the valid period, and new acquisition assist information obtained from the acquisition assist information providing server when the obtainment time of the acquisition assist information is judged as being past the valid period.

According to this configuration, since the valid period managing device, the valid period confirming device, and the acquisition assist information transmitting device are provided, there is no need to make communications with the acquisition assist information providing server in transmitting the acquisition assist information when the obtainment time of the acquisition assist information that matches with the request from the acquisition assist information evaluation server is within the valid period. It is thus possible to reduce the burden of information exchange, and the communication costs can be saved due to a reduction in information volume.

An acquisition assist information managing system in accordance with a third aspect of the present invention is the system of the first or second aspect, wherein a plurality of acquisition assist information evaluation servers is provided, and the relay server includes a request integrating device to integrate requests for the same acquisition assist information from the plurality of acquisition assist information evaluation servers.

According to this configuration, since the request integrating device is provided, even when the number of the acquisition assist information evaluation servers is increased, it is possible to suppress an increase of requests for the acquisition assist information to the acquisition assist information providing server by integrating requests for the same acquisition assist information from the plurality of acquisition assist information evaluation servers. Hence, even in such a case, not only is it possible to reduce the burden of information exchange between the acquisition assist information evaluation server and the acquisition assist information providing server, but it is also possible to reduce the information volume to be communicated, which can in turn reduce communication costs.

An acquisition assist information managing system in accordance with a fourth aspect of the present invention is the system of any of the first through third aspects, wherein the evaluation information generating device gives, as the evaluation information, scores to respective results of test positioning on the basis of respective combinations of plural items of information included in the acquisition assist information.

According to this configuration, since the evaluation information generating device implements the generation of evaluation information by giving scores, the results of test positioning by acquiring the satellite with the use of combinations of plural items of information included in the acquisition assist information can be objectively evaluated. The acquisition assist information specifying device is thus able to specify objectively a combination of plural items of information that can reach the numerical target related to positioning from the user equipment. The user equipment is thus able to perform positioning while reaching the numerical target related to positioning, with the use of the acquisition assist information that is specified objectively in this manner.

An acquisition information managing system in accordance with a fifth aspect of the present invention is the system of any of the first through fourth aspects, wherein plural items of information included in the acquisition assist information include different kinds of information. According to this configuration, influence given to the acquisition of the satellite with the use of the acquisition assist information is larger when the plural items of information included in the acquisition assist information are different kinds of information from those in a case in which the plural items of information are made of the same kind of information. Hence, when test positioning is performed by acquiring the satellite with the use of the acquisition assist information including combinations of different kinds of information, differences are generated in contents of respective pieces of evaluation information in comparison with a case when test positioning is performed by acquiring the satellite with the use of the acquisition assist information including combinations of the same kind of information.

Since the acquisition assist information specifying device is able to specify the acquisition assist information that can reach the numerical target related to positioning closer to the request from the user equipment on the basis of the acquisition assist information including plural items of information that produces larger differences among their respective pieces of evaluation information, the user equipment is able to perform positioning while reaching the numerical target related to positioning close to the request with the use of the acquisition assist information thus specified.

An acquisition assist information system in accordance with a sixth aspect of the present invention is the system of any of the first through fifth aspects, wherein the user equipment is configured to request a time, including an acquisition time, needed to complete positioning, positioning accuracy, and/or a communication volume of the acquisition assist information, either solely or in combination, as the numerical target related to positioning.

According to this configuration, since the numerical target related to positioning is a time, including the acquisition time, needed to complete the positioning, the positioning accuracy, and/or a communication volume of the acquisition assist information, either solely or in combination, the user equipment is able to obtain the acquisition assist information that matches with the request. Since the user equipment performs positioning by acquiring the satellite with the use of the acquisition assist information that matches with the request, it is possible to enhance ease of operation at the time of positioning for the operator by merely setting the numerical target such that satisfactory ease of operation is realized for the operator as a request of the user equipment.

An acquisition assist information managing system in accordance with a seventh aspect of the present invention is the system of any of the first through sixth aspects, wherein the acquisition assist information evaluation server is installed in a base station through which the user equipment makes data communications. According to this configuration, since the acquisition assist information evaluation server is installed in the base station, the acquisition assist information evaluation server and the user equipment are in proximity to each other. Hence, a point at which the acquisition assist information evaluation server performed the test positioning and a point at which the user equipment actually performs positioning are in proximity to each other. The positioning situation when the acquisition assist information evaluation server performed test positioning and the positioning situation when the user equipment actually performs the positioning are thus close, which enables the user equipment to obtain the acquisition assist information that more fully reflects the request. The user equipment acquires the satellite by obtaining the acquisition assist information that more fully reflects the request, and is thus able to perform positioning while reaching a desired numerical target related to positioning.

An acquisition assist information managing system in accordance with an eighth aspect of the present invention is the system of any of the first through seventh aspects, wherein the user equipment is a mobile phone. According to this configuration, a mobile phone is used as the user equipment. Mobile phones have been used widely, and it is evident that various operators perform various operations. Purposes of positioning differ considerably from operator to operator, and the numerical targets related to positioning, therefore, are different. Since the satellite can be acquired by obtaining the acquisition assist information that more fully reflects the request as described above, it is possible for a mobile phone, owned by an operator who wishes a different numerical target related to positioning, to perform positioning while reaching a desired numerical target related to positioning.

An acquisition assist information managing device in accordance with a ninth aspect of the present invention is provided to evaluate and to manage acquisition assist information between user equipment and an acquisition assist information providing server. The user equipment performs positioning by acquiring a satellite with the use of the acquisition assist information. The acquisition assist information is information to assist acquisition of a satellite that outputs satellite radio waves and includes plural items of information. The user equipment then receives the satellite radio waves from the acquired satellite. The acquisition assist information providing server provides the acquisition assist information. The acquisition assist information managing device includes an acquisition assist information request accepting device, a combination generating device, a test positioning device, an evaluation information generating device, a combination specifying device, and an acquisition assist information providing device. The acquisition assist information request accepting device accepts a request for the acquisition assist information from the user equipment that makes a request for the acquisition assist information to the acquisition assist information evaluation server by setting a numerical target related to positioning. The acquisition assist information obtaining device makes a request for the acquisition assist information to the acquisition assist information providing server, and thereby obtaining the acquisition assist information including the plural items of information from the acquisition assist information providing server. The combination generating device generates combinations of respective items of information included in the obtained acquisition assist information. The test positioning device performs test positioning by repetitively acquiring the satellite with the use of the combinations of respective items of information. The evaluation information generating device generates evaluation information by evaluating respective results of test positioning performed by acquiring the satellite with the use of the combinations of respective items of information. The combination specifying device specifies, on the basis of the evaluation information, a combination of respective items of information capable of reaching the numerical target related to positioning from the user equipment. The acquisition assist information providing device provides the user equipment with the acquisition assist information including the specified combination of respective items of information.

According to this configuration, since the acquisition assist information managing device includes the combination generating device, the test positioning device, the evaluation information generating device, and the combination specifying device, the evaluation information generating device generates the evaluation information for the results of the test performed by acquiring the satellite with the use of combinations of respective items of information included in the acquisition assist information. Further, the combination specifying device specifies, on the basis of the evaluation information, a combination of respective items of information that matches with the request from the user equipment in which the numerical target related to positioning is set. The acquisition assist information providing device then places the respective items of information that match with the request from the user equipment into the acquisition assist information, and transmits the resulting acquisition assist information to the user equipment.

The combination of plural items of information included in the acquisition assist information that has been transmitted to the user equipment matches with the request from the user equipment, and therefore is the one to enable the numerical target related to positioning by the user equipment to be reached. Hence, when the user equipment acquires the satellite with the use of the acquisition assist information including the combination of respective items of information thus specified, and performs positioning with the use of satellite radio waves received from the acquired satellite, the numerical target related to positioning becomes closer to the request from the user equipment. The user equipment is thus able to perform positioning by acquiring the satellite with the use of the acquisition assist information while reaching a desired numerical target related to positioning.

An acquisition assist information managing method in accordance with a tenth aspect of the present invention is provided to evaluate and to manage acquisition assist information between user equipment and an acquisition assist information providing server. The user equipment performs positioning by acquiring a satellite with the use of the acquisition assist information. The acquisition assist information is information to assist acquisition of a satellite that outputs satellite radio waves and includes plural items of information. The user equipment then receives the satellite radio waves from the acquired satellite. The acquisition assist information providing server provides the acquisition assist information. The method includes: an acquisition assist information request accepting step of accepting a request for the acquisition assist information from the user equipment that makes a request for the acquisition assist information to the acquisition assist information evaluation server by setting a numerical target related to positioning; an acquisition assist information obtaining step of making a request for the acquisition assist information to the acquisition assist information providing server, and thereby obtaining the acquisition assist information including the plural items of information from the acquisition assist information providing server; a combination generating step of generating combinations of respective items of information included in the obtained acquisition assist information; a test positioning step of performing test positioning by repetitively acquiring the satellite with the use of the combinations of respective items of information; an evaluation information generating step of generating evaluation information by evaluating respective results of test positioning performed by acquiring the satellite with the use of the combinations of respective items of information; a combination specifying step of specifying, on the basis of the evaluation information, a combination of respective items of information capable of reaching the numerical target related to positioning from the user equipment; and an acquisition assist information providing step of providing the user equipment with the acquisition assist information including the specified combination of respective items of information.

According to this configuration, the evaluation information is generated for the results of the test performed by acquiring the satellite with the use of combinations of respective items of information included in the acquisition assist information in the evaluation information generating step, and a combination of respective items of information that matches with the request from the user equipment is specified on the basis of the evaluation information in the combination specifying step. In the acquisition assist information providing step, the respective items of information that match with the request from the user equipment are placed into the acquisition assist information, and the resulting acquisition assist information is transmitted to the user equipment.

The combination of plural items of information included in the acquisition assist information that has been transmitted to the user equipment matches with the request from the user equipment, and therefore is the one to enable the numerical target related to positioning by the user equipment to be reached. Hence, when the user equipment acquires the satellite with the use of the acquisition assist information including the combination of respective items of information thus specified, and performs positioning with the use of satellite radio waves received from the acquired satellite, the numerical target related to positioning becomes closer to the request from the user equipment. The user equipment is thus able to perform positioning by acquiring the satellite with the use of the acquisition assist information while reaching a desired numerical target related to positioning.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 6 is a view showing an example of the configuration of assist data of the system shown in FIG. 5;

FIGS. 9(A) to 9(C) are views showing examples of results of test positioning with the use of combinations of respective items of information of the system;

FIGS. 10(A) and 10(B) are views showing an example of the results of test positioning and the ranking thereof;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In other words, hereinafter, preferred embodiments of the invention will be described with reference to the drawings. Being suitable examples of the invention, embodiments described below include various limitations that are technically preferred. The scope of the invention, however, is not limited to the embodiments below unless so specified in the descriptions below.

First Embodiment

Figure 1:
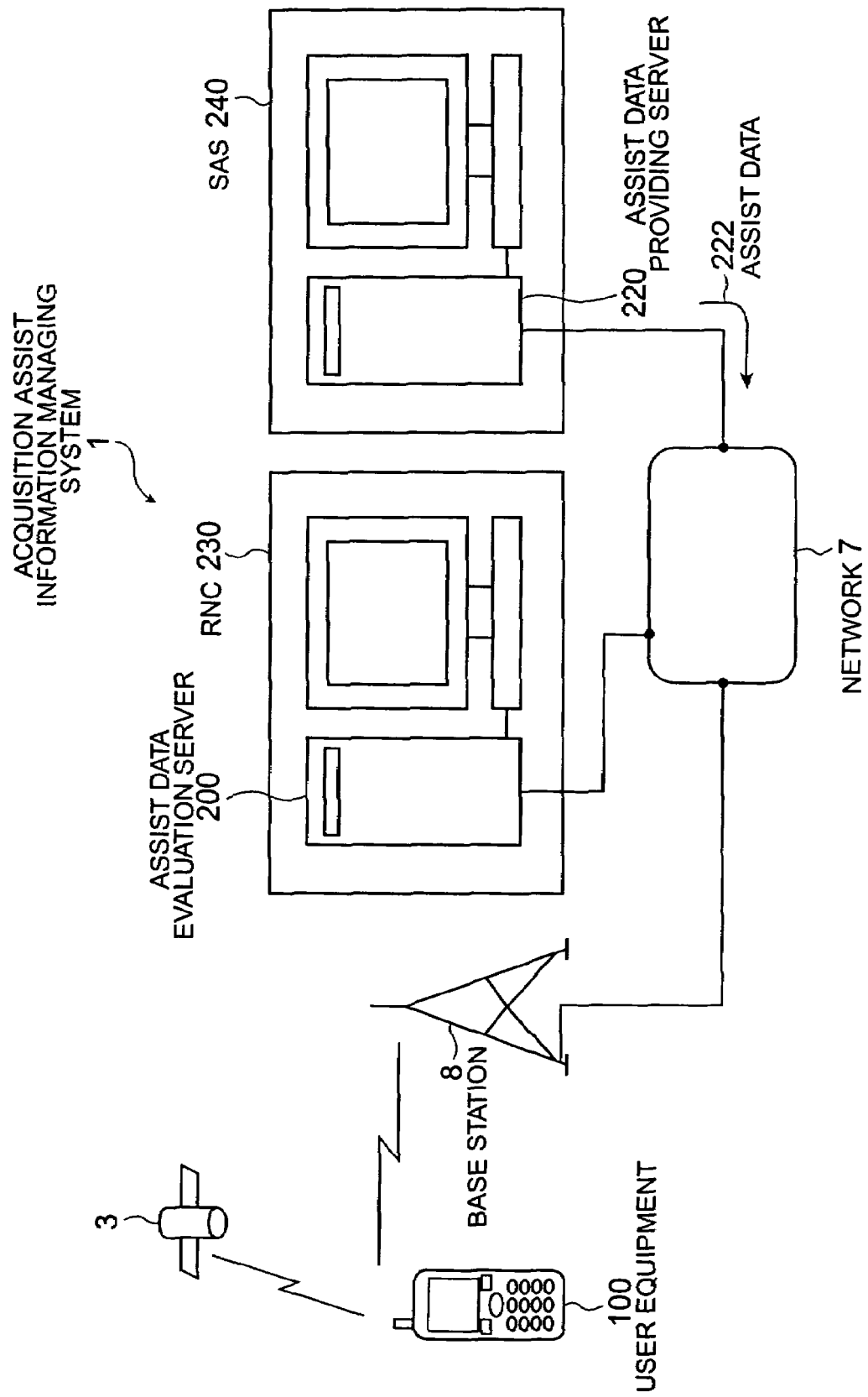
FIG. 1 is a system configuration view showing an example of the configuration of an acquisition assist information managing system in accordance with a first preferred embodiment of the present invention.

FIG. 1 is a system configuration view showing an example of the configuration of an acquisition assist information managing system 1 according to a first preferred embodiment of the present invention.

The acquisition assist information managing system 1 has user equipment 100, an RNC (Radio Network Control) 230, and an SAS (Satellite Access Station) 240, which are interconnected to each other via a base station 8 and a network 7. The acquisition assist information managing system 1 forms a so-called network assist type GPS (Global Positioning System), for example, with respect to the positioning of the user equipment 100.

The RNC 230 includes an assist data evaluation server 200 described below. Further, the assist data evaluation server 200 is linked to the network 7. The SAS 240 includes an assist data providing server 220 described below. The assist data providing server 220 is also linked to the network 7. The network 7 is configured to make data communications using, for example, TCP/IP (Transmission Control Protocol/Internet Protocol) as the communication protocol.

The user equipment 100 is, for example, a mobile phone, and it is preferably a mobile user equipment that is carried by the operator. The user equipment 100 is configured to make data communications with the base station 8, for example, by radio waves. The user equipment 100 is configured to perform positioning, for example, with the use of the GPS. That is to say, the user equipment 100 is configured to perform positioning by receiving satellite radio waves from a satellite 3, and then analyzing a navigation message included in the satellite radio waves. In this instance, the characteristic of the user equipment 100 is that it acquires the satellite 3 with the use of assist data 222 used as acquisition assist information. The assist data 222 referred to herein are, for example, information to assist the acquisition of the satellite 3 that outputs satellite radio waves, and they are information including plural items of information described below. The user equipment 100 is connected to the assist data evaluation server 200 and the assist data providing server 220 via the base station 8 and the network 7 by either radio waves or cables.

As will be described below, the assist data evaluation server 200 is configured to evaluate assist data between the assist data providing server 220 and the user equipment 100. The assist data evaluation server 200 is furnished with a function of performing evaluation as described below by previously performing test positioning on behalf of the user equipment 100 before the user equipment 100 performs positioning. In this embodiment, positioning performed by the user equipment 100 is referred to as "positioning," and positioning performed by the assist data evaluation server 200 is referred to as "test positioning." The evaluation method of the assist data will be described below. Meanwhile, the assist data providing server 220 is furnished with a function of providing the assist data 222. The assist data 222 are information to assist the user equipment 100 in acquiring the satellite 3 prior to actual positioning.

In this embodiment, "acquisition time" means a time from when the user equipment 100 started the acquisition of the satellite 3 until the acquisition is completed, and "positioning time" means a time from when the positioning was actually started with the use of the satellite 3 that had been acquired until the positioning is completed. "Time needed to complete the positioning (a time until the positioning is completed)" means the total time of the "acquisition time" and the "positioning time".

Figure 2:
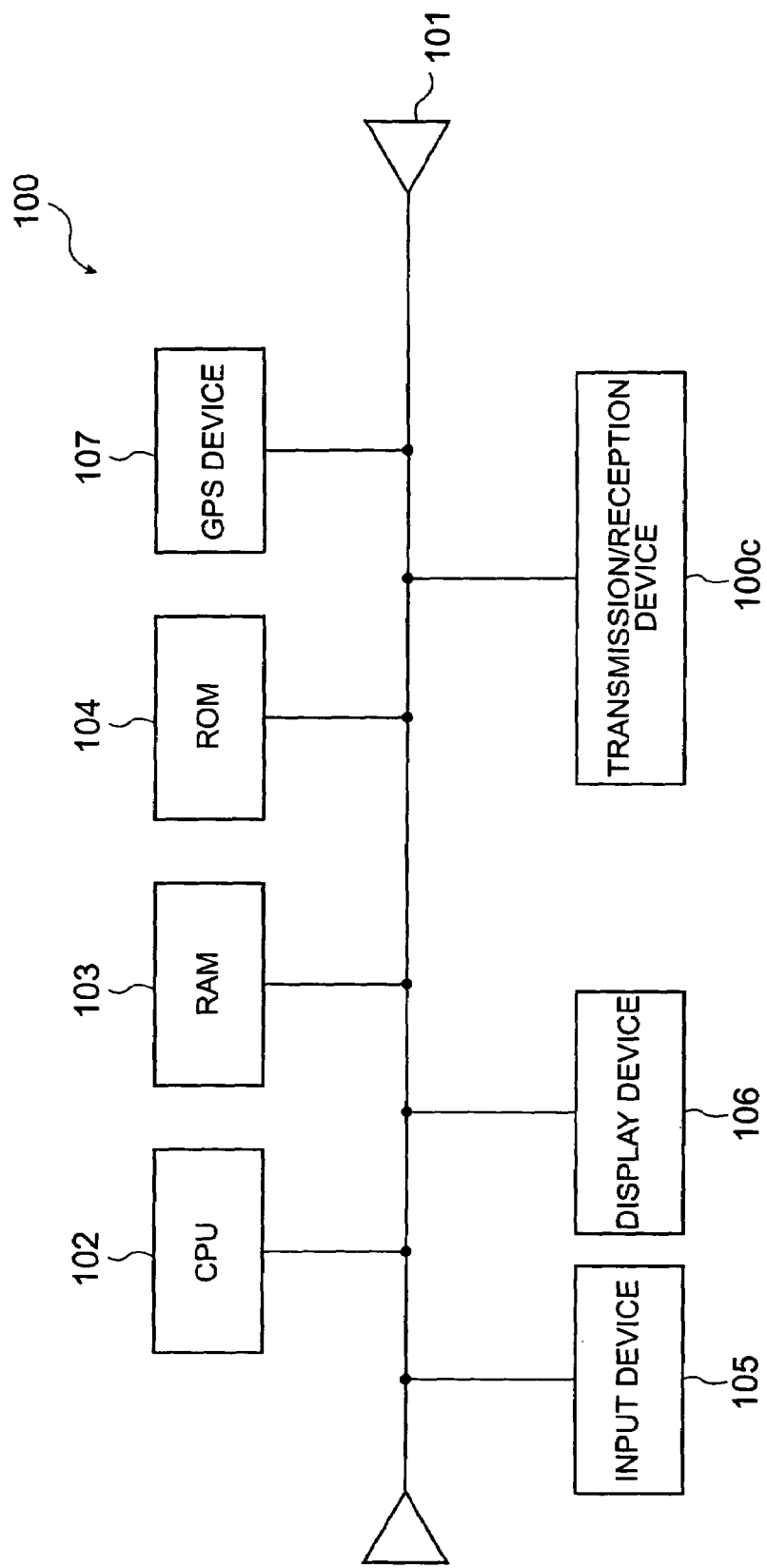
FIG. 2 is a view of a block diagram showing an example of the hardware configuration of user equipment of the system shown in FIG. 1.

FIG. 2 is a view of a block diagram showing an example of the hardware configuration of the user equipment 100 shown in FIG. 1. As is shown in FIG. 2, the user equipment 100 includes a bus 101. A CPU (Central Processing Unit) 102, a RAM (Random Access Memory) 103, a ROM (Read Only Memory) 104, etc. are connected to the bus 101. In addition, an input device 105, such as a so-called touch panel and manipulation buttons, a display device 106, such as a liquid crystal display, and a GPS device 107 are also connected to the bus 101. Further, a transmission/reception device 100c is connected to the bus 101. To be more specific, the bus 101 is furnished with a function of interconnecting respective devices. Further, the bus 101 preferably has an address bus and a data bus.

The CPU 102 not only executes jobs in a specific program, but also controls the ROM 104 and the like connected to the bus 101. The ROM 104 stores various programs and various kinds of information. The RAM 103 functions as an area to run a program. The transmission/reception device 100c is furnished with a function of enabling data communications between the user equipment 100 and external electronic equipment.

Figure 3:
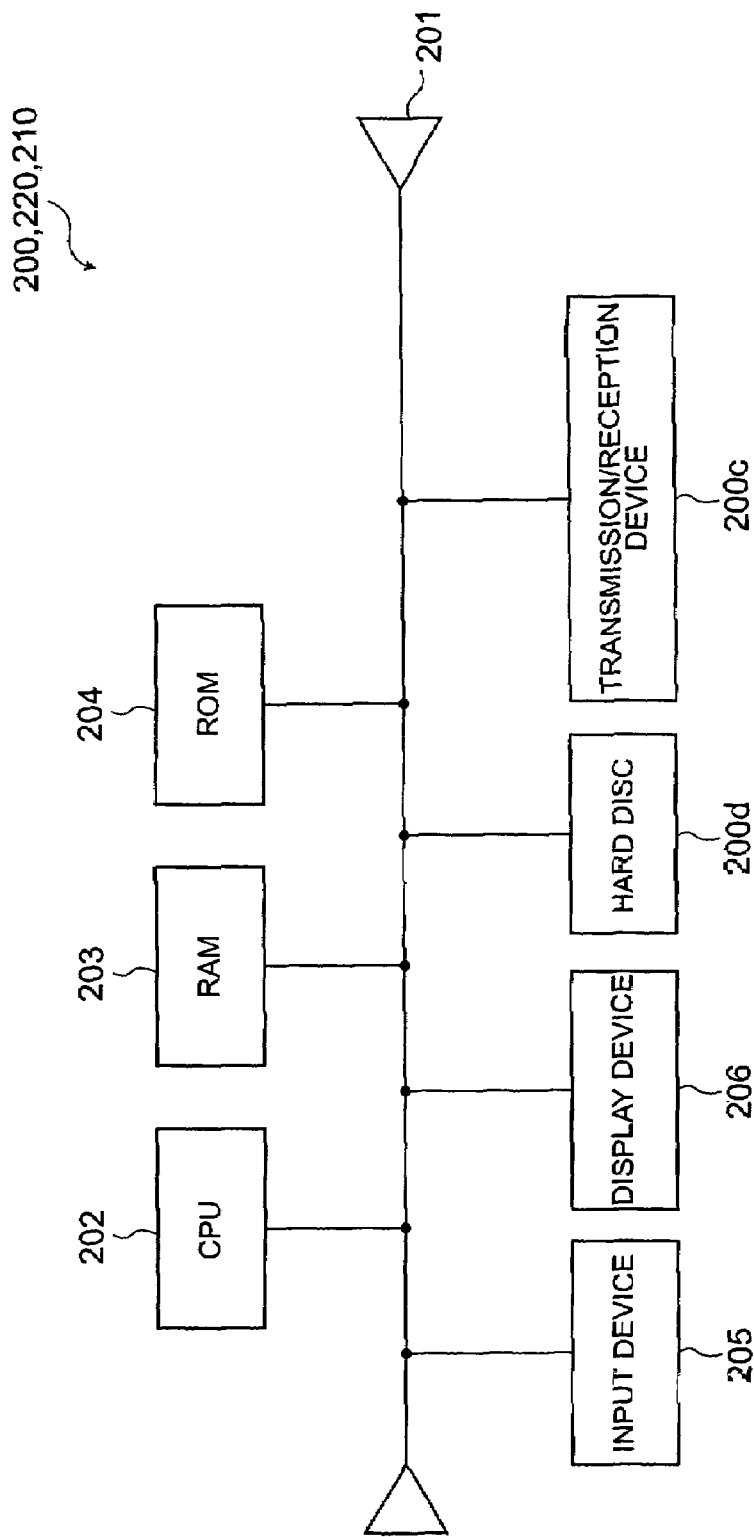
FIG. 3 is a view of a block diagram showing an example of the hardware configuration of an assist data evaluation server of the system.

FIG. 3 is a view of a block diagram showing an example of the hardware configuration of the assist data evaluation server 200 shown in FIG. 1. Since the hardware configuration of the assist data providing server 220 is similar to or the same as the example of the hardware configuration of the assist data evaluation server 200, a description thereof is omitted. The assist data evaluation server 200 includes, for example, a computer that preferably includes a bus 201, a CPU 202, a RAM 203 serving as a main storage device, a ROM 204, an input device 205, a display device 206, a transmission/reception device 200c, etc. These components are furnished with substantially the same functions as the bus 101 and the like described with the user equipment 100, and differ mainly in the areas of processing speed and storage capacity.

In addition, in contrast to the user equipment 100, the assist data evaluation server 200 is provided with a hard disc 200d serving as an auxiliary storage device. In the assist data evaluation server 200, for example, an operating system is activated, and as will be described below, exclusive control is performed by so-called semaphore with regards to data writing and reading in this operating system.

Figure 4:
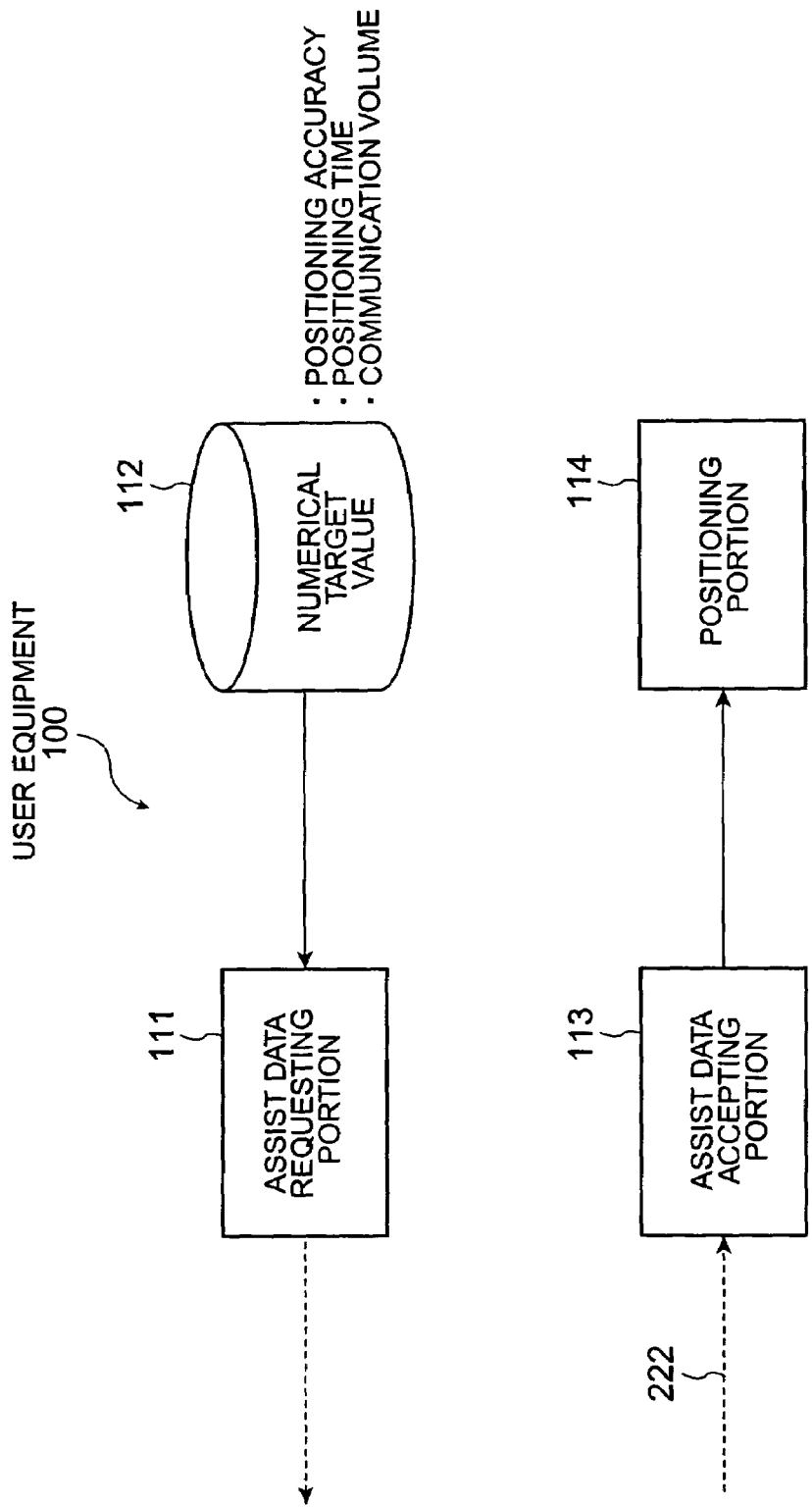
FIG. 4 is a view of a block diagram showing an example of the software configuration of the user equipment shown in FIG. 1.

FIG. 4 is a view of a block diagram showing an example of the software configuration of the user equipment 100 shown in FIG. 1. The user equipment 100 includes an assist data requesting portion 111 serving as an acquisition assist information requesting device, a numerical target value 112 used as the numerical target related to positioning, an assist data accepting portion 113, and a positioning portion 114.

The assist data requesting portion 111 is configured to make a request for assist data 222 to the assist data evaluation server 200 by setting the numerical target value 112, which is either a value set by the operator of the user equipment 100 or a pre-set value.

The numerical target value 112 related to positioning referred to herein represents an item that is deemed as the target related to positioning, for example, when the user equipment 100 performs positioning. Examples of the numeral target value 112 related to positioning include the acquisition time, the positioning time, a time needed to complete the positioning, and a volume of data communications, either solely or in combination. The numerical target value 112 related to positioning may be set in advance or set as the operator of the user equipment 100 desires.

The assist data accepting portion 113 is furnished with a function of receiving and accepting the assist data 222 from the assist data evaluation server 200 or the assist data providing server 220 as will be described below. The positioning portion 114 is furnished with a function of acquiring the satellite 3 by receiving assistance in acquiring the satellite 3 with the use of the assist data 222 accepted in the assist data accepting portion 113 by controlling the GPS device 107 shown in FIG. 2. Further, the positioning portion 114 is furnished with a function of performing positioning by receiving satellite radio waves from the satellite 3 thus acquired, and then analyzing a navigation message included in the satellite radio waves.

Figure 5:
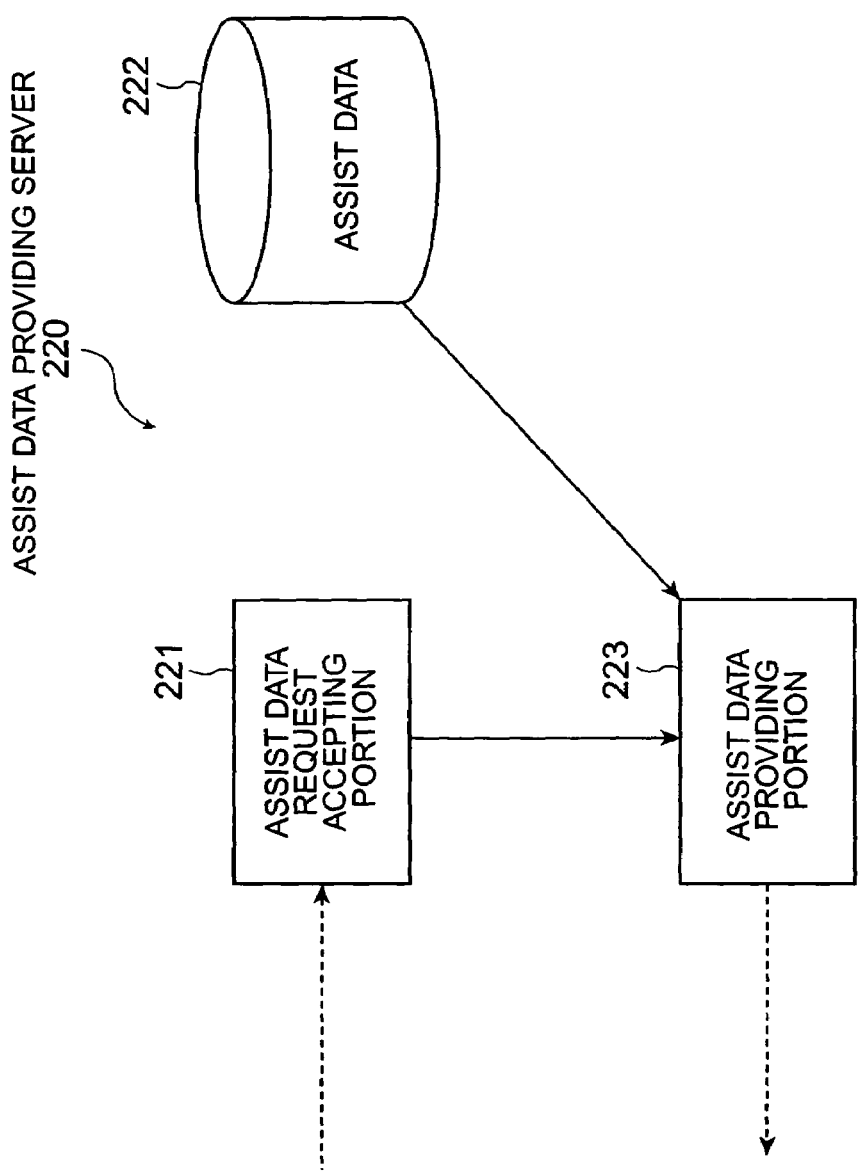
FIG. 5 is a view of a block diagram showing an example of the software configuration of the assist data providing server.

FIG. 5 is a view of a block diagram showing an example of the software configuration of the assist data providing server 220 shown in FIG. 1. FIG. 6 is a view showing an example of the configuration of the assist data shown in FIG. 5. The assist data providing server 220 shown in FIG. 5 includes an assist data request accepting portion 221, assist data 222, and an assist data providing portion 223.

The assist data request accepting portion 221 is furnished with a function of accepting a request for the assist data 222, for example, from the assist data evaluation server 200 or the user equipment 100. This request specifies the kinds of respective items of information that should be included in the assist data 222 to be provided.

The assist data 222 include, for example, a plurality in the kinds of items of information. For example, these plural items of information are preferably different kinds of information. As shown in FIG. 6, to be more specific, examples of these plural items of information include the time, the initial location, the ephemeris, the almanac, an ionospheric correction value, and/or a DGPS correction value, either solely or in combination.

The time referred to herein is an obtainment time indicating a time at which the assist data are obtained. The data size of the time is, for example, 31 bytes. The initial location indicates the initial location of the user equipment 100. The data size for the initial location is, for example, 15 bytes. The ephemeris is updated, for example, every hour and the valid period is set, for example, to two hours from the obtainment time. In addition, the data size of the ephemeris is, for example, 75 bytes×the number of satellites (up to 32 satellites).

The update cycle of the almanac is irregular, and the valid period is preferably about 2.8 days. The data size of the almanac is, for example, 1+26×the number of satellites (up to 32 satellites) bytes. The data size of an ionospheric correction value is, for example, 8 bytes. A DGPS correction value represents a correction value used when the so-called differential positioning is performed.

The assist data providing portion 223 is furnished with a function of obtaining the assist data 222 as per instruction from the assist data requesting portion 221 to provide the same, for example, to the assist data evaluation server 200 or the user equipment 100.

Figure 7:
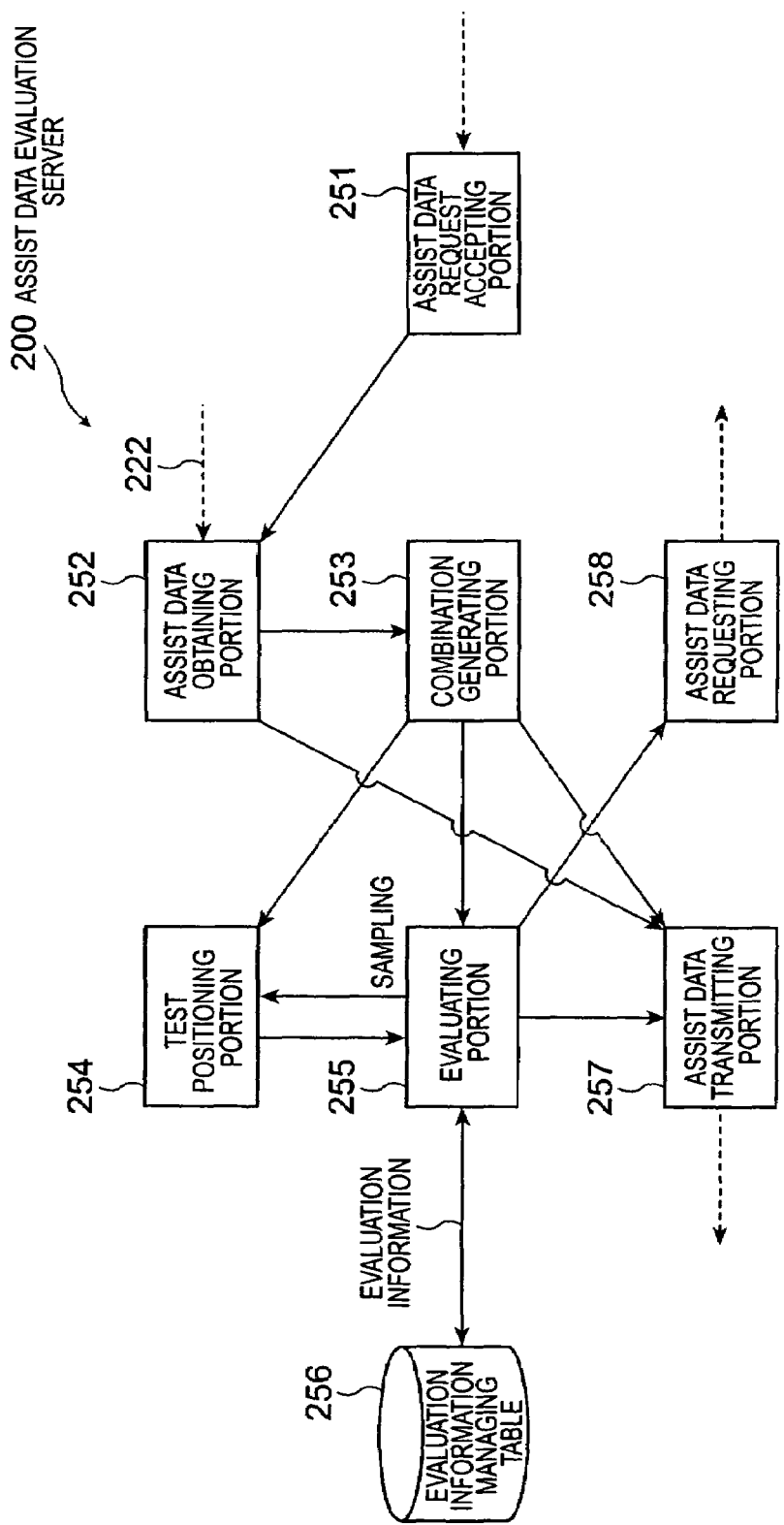
FIG. 7 is a view of a block diagram showing an example of the software configuration of the assist data evaluation server shown in FIG. 1.

FIG. 7 is a view of a block diagram showing an example of the software configuration of the assist data evaluation server 200 shown in FIG. 1. It should be noted that the operating system is omitted in FIG. 7. The example of the software configuration shown in FIG. 7 is an example of the configuration of a program that causes the acquisition assist information managing system 1 to exert the acquisition assist information managing function. The assist data evaluation data 200 includes an assist data request accepting portion 251 (acquisition assist information request accepting device), an assist data obtaining portion 252 (acquisition assist information obtaining device), a combination generating portion 253 (combination generating device), a test positioning portion 254 (test positioning device), an evaluating portion 255 (evaluation information generating device, combination specifying device), an evaluation information managing table 256, an assist data transmitting portion 257 (acquisition assist information providing device), and an assist data requesting portion 258.

The assist data request accepting portion 251 is furnished with a function of accepting a request for the assist data 222 from the user equipment 100. The assist data obtaining portion 252 makes a request for the assist data 222 to the assist data evaluation server 200 in making a request for the assist data 222 including plural items of information to the assist data providing server 220, and thereby obtains the assist data 222 including plural items of information from the assist data providing server 220.

The combination generating portion 253 is furnished with a function of generating combinations of respective items of information included in the assist data 222 thus obtained. The test positioning portion 254 is furnished with a function of performing test positioning, for example, with the use of the GPS by repetitively acquiring the satellite with the use of the combinations of respective items of information.

The evaluating portion 255 generates evaluation information by evaluating the respective results of test positioning performed by acquiring the satellite 3 with the use of the combinations of respective items of information. The evaluation information managing table 256 is configured to manage the evaluation information generated for each combination of respective items as has been described by the evaluating portion 255. The evaluating portion 255 also specifies, on the basis of the evaluation information, a combination of respective items of information that can reach the numerical target value 112 related to positioning from the user equipment 100.

The evaluating portion 255 is configured to give, as the evaluation information, for example, scores to the respective results of test positioning on the basis of the respective combinations of plural items of information included in the assist data 222. A method of giving the scores will be described in detail below.

The assist data transmitting portion 257 is furnished with a function of generating assist data 222 including the combination of respective items of information that can reach the numerical target value 112 related to positioning, and providing the same to the user equipment 100.

The assist data requesting portion 258 is furnished with a function of making a request for the assist data 222 to the assist data providing server 220, for example, by specifying the kinds of items of information that should be included in the assist data 222. The assist data providing server 220 is furnished with a function of providing the assist data 222 including respective items of information that are requested.

The acquisition assist information managing system 1 is of the configuration described above, and an example of operations thereof will be now be described with reference to FIG. 1 through FIG. 7.

Figure 8:
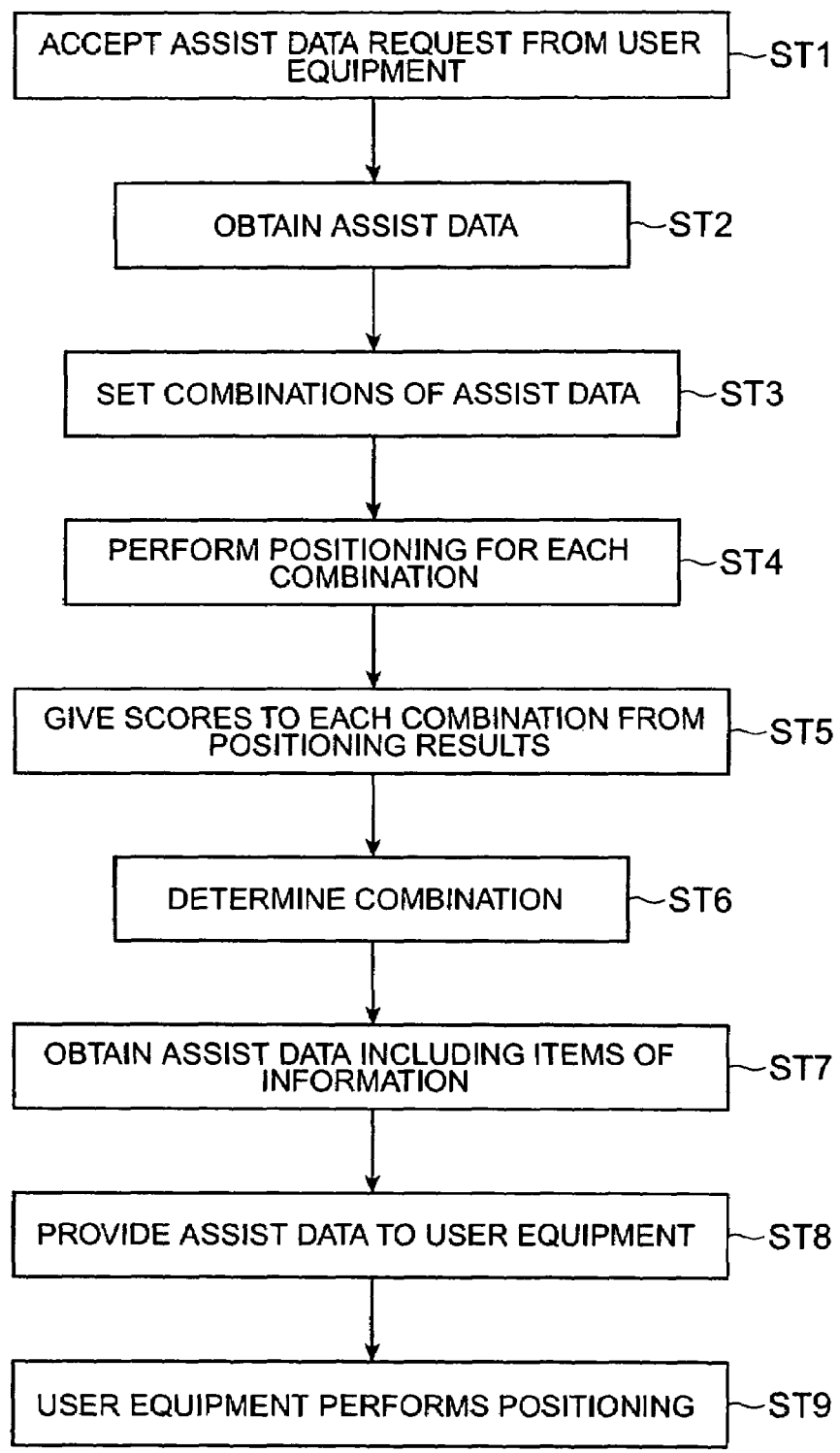
FIG. 8 is a view of a flowchart detailing the procedure of an acquisition assist information managing method in the acquisition assist information managing system.

FIG. 8 is a flowchart detailing an example of the procedure of the acquisition assist information managing method in the acquisition assist information managing system 1.

Acquisition Assist Information Requesting Step

Initially, as shown in FIGS. 1 and 8, in Step ST1, the user equipment 100 sets the numerical target related to positioning and makes a request for the assist data 222 to the assist data evaluation server 200, so that a request for the assist data 222 from the assist data evaluation server 200 is accepted. To be more specific, as shown in FIG. 4, the assist data requesting portion 111 in the user equipment 100 serving as the acquisition assist information requesting device obtains the numerical target value 112 related to positioning, and makes a request for the assist data 222 that matches with the numerical target value 112 related to positioning to the assist data evaluation server 200 shown in FIG. 1.

Referring now to FIGS. 1 and 4, the numerical target value 112 related to positioning referred to herein includes, for example, a time, including the acquisition time of the satellite 3, needed to complete the positioning, the positioning accuracy, a volume of data communications, either solely or in combination.

Referring to FIGS. 1, 7, and 8, in the subsequent Step ST2, the assist data evaluation server 200 makes a request for the assist data 222 to the assist data providing server 220, and obtains the assist data 222 including plural items of information from the assist data providing server 220. To be more specific, the assist data requesting portion 258 in the assist data evaluation server 200 makes a request for the assist data 222.

In the assist data providing server 220 shown in FIG. 5, the assist data request accepting portion 221 accepts the request for the assist data 222 from the assist data evaluation server 200, and issues a command to the assist data providing portion 223. The assist data providing portion 223 obtains, for example, assist data 222 prepared in advance, and provides the same to the assist data evaluation server 200 shown in FIG. 7. In the assist data evaluation server 200, the assist data obtaining portion 252 obtains the assist data 222.

Combination Generating Step

Referring again to FIGS. 1, 7, and 8, in the subsequent Step ST3, in the assist data evaluation server 200, the combination generating portion 253 generates combinations of respective items of information included in the assist data 222 thus obtained. To be more specific, the assist data 222 includes plural items of information as described above, and each item of information is one specific item of information used to assist the acquisition of the satellite 3 by way of the GPS positioning.

The combination generating portion 253 generates all the combinations among unit items of information included in the ephemeris shown in FIG. 6 as one example of the item of information to be included in the assist data 222. In this embodiment, as is shown in FIGS. 9(A) to 9(C), let the combinations of unillustrated respective items of information and the number of satellites to be acquired (hereinafter, referred to as the number of satellites) in the ephemeris be: Pattern 1 with 12 satellites, for example, as is shown in FIG. 9(A); Pattern 2 with 8 satellites, for example, as is shown in FIG. 9(B); and Pattern 3 with 4 satellites, for example, as is shown in FIG. 9(C).

As shown in FIGS. 1 and 8, in the subsequent Step ST4, test positioning is performed by repetitively acquiring the satellite 3 with the use of the combinations of respective items of information in the assist data 222. To be more specific, the test positioning portion 254 shown in FIG. 7 performs test positioning by acquiring the satellite 3 with the use of Pattern 1 shown in FIG. 9(A) through Pattern 3 shown in FIG. 9(C) representing the combinations. The results of test positioning using the assist data 222 that includes items of information in these combinations are set forth in FIG. 9(A) through FIG. 9(C).

A positioning location 93 shown in FIG. 9(A) through FIG. 9(C) represents a location obtained by actually performing the positioning for an actual location 91. An error range 95 represents a range of error when the positioning location 93 is positioned. In the result of test positioning for Pattern 1 in which the number of satellites is 12, as is shown in FIG. 9(A), the positioning time is short, the positioning accuracy is satisfactory, and the traffic volume is large. In the result of test positioning for Pattern 2 in which the number of satellites is 8, as is shown in FIG. 9(B), the positioning time is medium, the positioning accuracy is normal, and the traffic volume is medium. In the result of test positioning for Pattern 3 in which the number of satellites is 4, as is shown in FIG. 9(C), the positioning time is long, the positioning accuracy is poor, and the traffic volume is small.

In view of the results of test positioning as above, when priorities are given to the shortening of time, including the acquisition time, needed to complete the positioning, and the improvement of the positioning accuracy, it is preferable to choose Pattern 1. When priorities are given to a reduction of a traffic volume, it is preferable to choose Pattern 3. When the time, including the acquisition time, needed to complete the positioning is shortened to some extent while a traffic volume is reduced to some extent, it is preferable to choose Pattern 2.

Referring now to FIGS. 7 to 9, in the subsequent Step ST5, the evaluating portion 255 of FIG. 7 generates evaluation information by evaluating the respective results of test positioning performed by acquiring the satellite 3 with the use of Pattern 1 through Pattern 3, which are the combinations of respective items of information in the assist data 222. For example, scores given to the respective results of test positioning performed by acquiring the satellite 3 with the use of respective combinations of plural items of information included in the assist data 222 are adopted as the evaluation information. By giving scores as the evaluation information in this manner, it is possible to evaluate objectively the results of test positioning.

An example of the method of giving scores to the respective results of test positioning will now be described. In this example of evaluation, a focus is placed on three elements, for example, the number of satellites in the ephemeris (the data size of the ephemeris), the positioning accuracy, and time, including the acquisition time, needed to complete the positioning.

The positioning accuracy referred to herein means accuracy related to positioning that represents a difference between the actual coordinate and the coordinate found by the GPS positioning. When the difference is, for example, 10 m, it means that a coordinate 10 m away from the actual coordinate was found by the GPS positioning. The positioning time referred to herein means the time from reception of the satellite radio waves start after the acquisition of the satellite until the coordinate of the current location is found, and it means the time that excludes the acquisition time of the satellite 3.

A change in data volume associated with an increase/decrease of assist data to be requested will be described first. In this embodiment, a change in data size associated with an increase/decrease of assist data to be requested will be described using the ephemeris shown in FIG. 6 as an example. In the description below, the data size is shown by way of example in reference to the values shown in FIG. 6.

Relation Between Ephemeris and GPS Positioning

When the number of satellites in the obtained ephemeris is small, or the obtainment time of the ephemeris is old, time needed to complete the positioning is generally extended by as much as a factor of four (for example, it is extended from about 10 s to 40 s), which increases the positioning accuracy by about 10 m.

As is shown in FIG. 6, the data size of the ephemeris for one satellite 3 is, for example, 27 bytes. The smallest number of necessary satellites for the GPS positioning is 3, and 4 when the time synchronization is necessary. Further, the number of satellites that can be acquired at a given point is about 8 to 12.

In view of the foregoing, the data sizes of the ephemeris are compared among respective cases where the numbers of satellites are 4, 8, and 12.

When the number of satellites is 4: 75 bytes×4=300 bytes.
When the number of satellites is 8: 75 bytes×8=600 bytes.
When the number of satellites is 12: 75 bytes×12=900 bytes.

By referring to these results, it is understood that there is a direct proportionality simply according to the number of satellites, and there is a 3-fold difference between the cases of 4 satellites and 12 satellites. The ephemeris of even more satellites can be sent due to an orbital prediction, and in this case, the difference will be increased further.

As is shown in FIG. 6, the update interval of the ephemeris is, for example, one hour. This means that once new assist data 222 are obtained, no update takes place for one hour. Hence, data volumes when a request for the ephemeris is made every hour and when a request is made every five minutes are compared. The comparison is made on the assumption that the number of satellites is 8 and a request period is two hours.

When a request is made every hour: (75 bytes×8)×2 (times: 120 min/60 min)=1200 bytes When a request is made in every five minutes: (75 bytes×8)×24 (times: 120 min/5 min)=14400 bytes It is also understood that there is direct proportionality simply according to the request interval. However, the contents of the ephemeris obtained every one hour and every five minutes are the same, whereas there is a 12-fold difference in data volume.

Method of Scoring

Let combinations of respective items of information in the assist data, which are the subjects to be scored, be three sets in which the numbers of satellites used for the GPS positioning, that is, for example, the number of satellites of the ephemeris, is 4, 8, and 12. The positioning accuracy and a time needed to complete the positioning are obtained by performing test positioning independently for these combinations: Pattern 1 (Combination 3), Pattern 2 (Combination 2), and Pattern 3 (Combination 1), and the results of test positioning for these combinations of respective items of information are, for example, set forth in FIG. 10(A).

The evaluating portion 255 then gives the results of test positioning an A through D ranks, for example, according to the rules as follows.

The Number of Satellites (Data Size)

When the data size is equal to 300 bytes or smaller, the result is given an A rank, and when the data size is larger than 300 bytes and equal to 400 bytes or smaller, the result is given a B rank. When the data size is larger than 400 bytes and equal to 600 bytes or smaller, the result is given a C rank, and when the data size is larger than 600 bytes, the result is given a D rank.

Positioning Accuracy

When an error is 10 m or less, the result is given an A rank, and when an error is larger than 10 m and equal to 15 m or less, the result is given a B rank. When an error is larger than 15 m and equal to 20 m or less, the result is given a C rank, and when an error is larger than 25 m, the result is given a D rank.

Time Needed to Complete the Positioning

When the time is 10 s or shorter, the result is given an A rank, and when the time is longer than 10 s and equal to 15 s or shorter, the result is given a B rank. When the time is longer than 15 s and equal to 20 s or shorter, the result is given a C rank, and when the time is longer than 20 s, the result is given a D rank.

FIG. 10(B) shows ranks when the evaluating portion 255 gives the results of respective combination patterns to ranks. Referring to the ranking results in the drawing, two tendencies can be understood. That is to say, a first tendency is that, for example, the number of satellites (data size) and the positioning accuracy are directly proportional, and a second tendency is that, for example, the number of satellites (data size) and a time needed to complete the positioning are inversely proportional. The evaluating portion 255 generates evaluation information as has been described, and the evaluation information is managed in the evaluation information managing table 256.

Combination Specifying Step

Referring to FIGS. 7 and 8, in the subsequent Step ST6, the evaluating portion 255 shown in FIG. 7 specifies, on the basis of the evaluation information, a combination of respective items of information included in the assist data 222 that can reach the numerical target value 112 related to positing from the user equipment 100. To be more specific, the evaluating portion 255 chooses a combination of respective items of information included in the assist data 222 as follows on the basis of the ranking results described above.

Assume that when choosing a condition the traffic volume (data size), the positioning accuracy, and a time needed to complete the positioning are given priority. Three examples are given under such a condition as the precondition, and a manner in which a combination of respective items of information in the assist data 222 is chosen in each example will be described.

A first example is a case in which the top priority is given to the saving of traffic volume (data size), and the condition under which traffic volume can be saved among the ranking results set forth in FIG. 10(B) is Combination 1 (Pattern 3), for which the data size is given an A rank. Hence, the item of information in the assist data 222 to be chosen relates to the ephemeris in which the number of satellites is 4.

A second example is a case in which the priority is given to a time needed to complete the positioning and the positioning accuracy, and the condition under which both the positioning time and the positing accuracy are given an A rank in FIG. 10(B) is Combination 3 (Pattern 1). Hence, the item of information in the assist data 222 to be chosen relates to the ephemeris in which the number of satellites is 12.

Further, a third example is a case in which the top priority is given to the time needed to complete the positioning and traffic volume (data size) is limited to 600 bytes or smaller, the condition under which a time needed to complete the positioning is given an A or B ranks and the traffic volume is 600 bytes or smaller (any of A, B, or C ranks) in FIG. 10(B) is Combination 2 (Pattern 2). Hence, the assist data 222 to be chosen include the ephemeris in which the number of satellites is 8. In this manner, the evaluating portion 255 shown in FIG. 7 specifies the combination of respective items of information.

Referring again to FIGS. 7 and 8, in the subsequent Step ST7, the assist data requesting portion 258 makes a request for the assist data 222 including respective items of information specified by the evaluating portion 255 to the assist data providing server 220. The assist data obtaining portion 252 thus obtains the assist data 222 including these items of information from the assist data providing server 220. The assist data 222 thus obtained are delivered to the assist data transmitting portion 257.

Acquisition Assist Information Providing Step

In the subsequent Step ST8, in the assist data evaluation server 200, the assist data transmitting portion 257 provides the assist data 222 including respective items of information specified as above to the user equipment 100 through transmission via the base station 8 and the network 7. The user equipment 100 shown in FIG. 1 acquires the satellite 3 with the use of the assist data 222 that include respective items of information thus specified, and performs positioning by analyzing a navigation message included in the satellite radio waves received from the acquired satellite 3.

It is preferable that the assist data evaluation server 200 is installed in the base station 8 through which the user equipment 100 makes data communications. When configured in this manner, the assist data evaluation server 200 and the user equipment 100 are in proximity to each other. Hence, a point at which the assist data evaluation server 200 performed the test positioning and a point at which the user equipment 100 actually performs positioning are in proximity to each other. The positioning situation when the assist data evaluation server 200 performed test positioning and the positioning situation when the user equipment 100 actually performs the positioning are thus close, which enables the user equipment 100 to obtain the assist data 222 that more fully reflects the request. The user equipment 100 acquires the satellite 3 by obtaining the assist data 222 that more fully reflects the request, and is thus able to perform positioning while reaching the desired numerical target value 112 related to positioning.

In this embodiment, it is preferable that plural items of information included in the assist data 222 are different kinds of information as has been described. When configured in this manner, influence given to the acquisition of the satellite 3 with the use of the assist data 222 is larger when the plural items of information included in the assist data 222 are different kinds of information from when plural items of information are the same kind of information. Hence, when test positioning is performed by acquiring the satellite 3 with the use of the assist data 222 that includes combinations of information of different kinds, differences are generated in contents of respective pieces of evaluation information in comparison with a case when test positioning is performed by acquiring the satellite 3 with the use of the assist data 222 that includes combinations of information of the same kind.

Since the evaluating portion 255 shown in FIG. 7 is able to specify the assist data 222 that can reach the numerical target value 112 related to positioning closer to the request from the user equipment 100 on the basis of the assist data 222 including plural items of information that produce larger differences among respective pieces of evaluation information, the user equipment 100 is able to perform positioning while reaching the numerical target value 112 related to positioning close to the request with the use of the assist data 222 thus specified.

As has been described, according to the first embodiment of the invention, the evaluating portion 255 shown in FIG. 7 generates evaluation information using the results of the test performed by acquiring the satellite 3 with the use of combinations of respective items of information included in the assist data 222, and specifies, on the basis of the evaluation information, a combination of respective items of information that matches with the request in which the numerical target related to positioning by the user equipment 100 is set.

The assist data transmitting portion 257 places respective items of information that match with the request from the user equipment 100 into the assist data 222, and transmits the assist data 222 to the user equipment 100. The combination of plural items of information included in the assist data 222 that has been transmitted to the user equipment 100 matches with the request from the user equipment 100, and it is the one to enable the numerical target value 112 related to positioning by the user equipment 100 to be reached. Hence, when the user equipment 100 acquires the satellite 3 with the use of the assist data 222 including the combination of respective items of information thus specified, and performs positioning with the use of the satellite radio waves received from the acquired satellite 3, the numerical target value 112 becomes close to the request from the user equipment 100. The user equipment 100 is thus able to perform positioning by acquiring the satellite 3 with the use of the assist data 222 while reaching the desired numerical target value 112 related to positioning.

By giving scores as the evaluation information as described above, the evaluating portion 255 is able to specify objectively plural combinations that can reach the numerical target value 112 related to positioning from the user equipment 100. The user equipment 100 is thus able to perform positioning by acquiring the satellite 3 with the use of the assist data 222 specified objectively in this manner while reaching the numerical target value 112 related to positioning.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Second Embodiment

A second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

Second Embodiment

Figure 11:
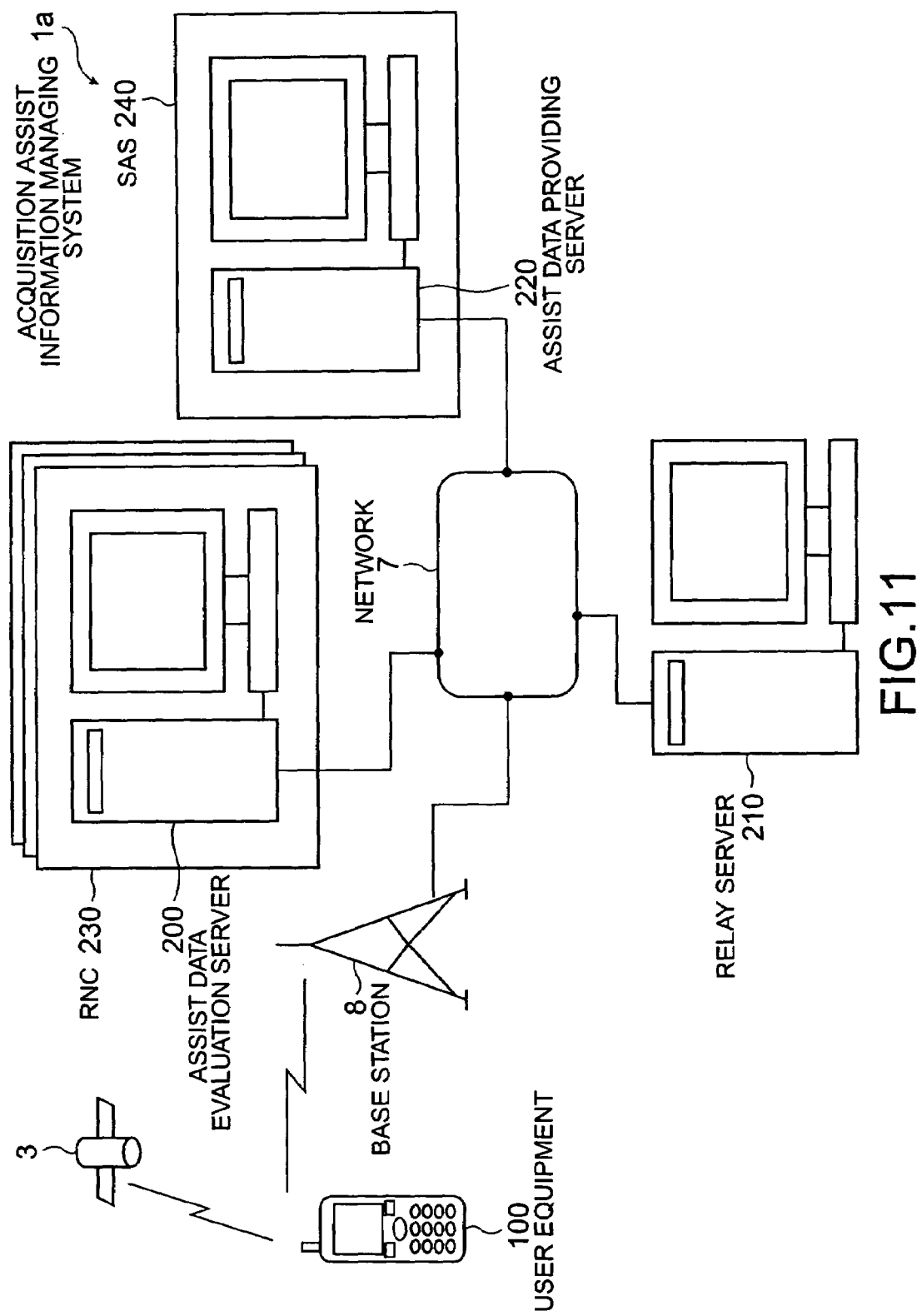
FIG. 11 is a view of a system configuration view showing an example of the configuration of an acquisition assist information managing system in accordance with a second preferred embodiment of the present invention.

FIG. 11 is a system configuration view showing an example of the configuration of an acquisition assist information managing system 1a in accordance with a second preferred embodiment of the present invention.

The acquisition assist information managing system 1a of the second embodiment of the present invention has substantially the same configuration as the acquisition assist information managing system 1 of the first embodiment shown in FIG. 1 through FIG. 10 for those portions labeled with the same reference numerals. The portions with same or similar configuration as those in FIG. 1 through FIG. 10 are labeled with common reference numerals, and a description thereof is omitted. Thus, description is primarily directed to the major differences between the inventions of the first and second embodiments.

The main differing characteristic of the acquisition assist information managing system 1a in the second embodiment is that it includes a relay server 210, which is absent in the acquisition assist information managing system 1 of the first embodiment. The relay server 210 is furnished with a function of relaying the assist data 222, for example, between the assist data providing server 220 and the assist data evaluation server 200. That is, in the second embodiment, the relay server 210 relays a request from the assist data evaluation server 200 and the relay server 210 makes a request for the assist data 222 to the assist data providing server 220 instead of a configuration in which the assist data evaluation server 200 makes a request for the assist data 222 directly to the assist data providing server 220. The hardware configuration of the relay server 210 is substantially the same as that of the assist data evaluation server 200 shown in FIG. 3, and a description thereof is omitted.

Figure 12:
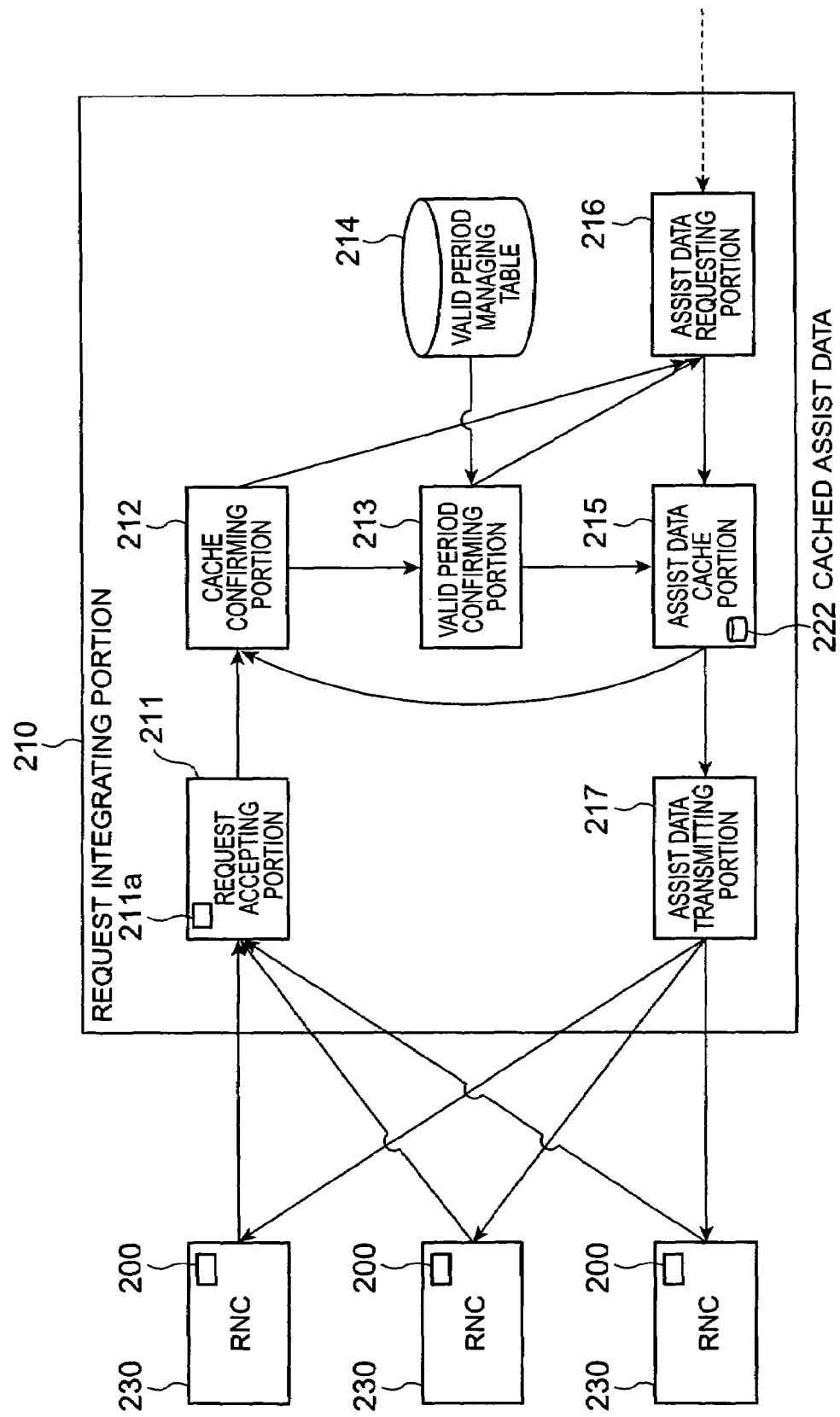
FIG. 12 is a view of a block diagram showing an example of the software configuration of a relay server shown in FIG. 11.

FIG. 12 is a view of a block diagram showing an example of the software configuration of the relay server 210 shown in FIG. 11. The relay server 210 includes a request accepting portion 211 (request accepting device), a cache confirming portion 212, a valid period managing table 214 (valid period managing device), a valid period confirming portion 213 (valid period conforming device), an assist data requesting portion 216, an assist data cache portion 215 (acquisition assist information storage device), and an assist data transmitting portion 217 (acquisition assist information transmitting device).

The request accepting portion 211 is furnished with a function of accepting a request for the assist data 222 from the assist data evaluation server 200 within the RNC 230. It is preferable that the request accepting portion 211 includes a request integrating portion 211a as an example of request integrating device. The request integrating portion 211a is furnished with a function of integrating requests for the same assist data 222 from a plurality of assist data evaluation servers 200 when the plurality of assist data evaluation servers 200 is present.

By providing the request integrating portion 211a, it is possible to suppress an increase of requests for the assist data 222 to the assist data evaluation servers 200 by integrating requests for the same assist data 222 from various assist data evaluation servers 200 even when the number of the assist data evaluation servers 200 is increased. Hence, even in such a case, not only is it possible to reduce the burden of information exchange between the assist data evaluation servers 200 and the assist data providing server 220, but it is also possible to reduce the volume of information to be communicated, which can in turn save the communications costs.

The valid period managing table 214 is furnished with a function of managing a valid period, during which the assist data 222 is valid for assisting the acquisition of the satellite 3, for each piece of assist data 222. The valid period confirming portion 213 confirms whether the obtainment time of the assist data 222 that match with the request from the assist data evaluation server 200 is within the valid period of the assist data 222. The assist data requesting portion 216 is configured to make a request for the assist data 222 to the assist data providing server 220. The assist data cache portion 215 is configured to store obtained assist data 222 when the assist data 222 that have been obtained from the assist data providing server 220 are present. The cache confirming portion 212 is furnished with the function of confirming whether the obtained assist data 222 have been already stored in the assist data cache portion 215. The assist data transmitting portion 217 is furnished with a function of transmitting to the assist data evaluation server 200 the obtained assist data 222 stored in the assist data cache portion 215 when the obtainment time of the assist data 222 is judged as being within the valid period, and new assist data 222 obtained from the assist data providing server 220 when the obtainment time of the assist data 222 is out of the valid period.

The acquisition assist information managing system 1a is configured as has been described, and an example of operations of the relay server 210 will now be described with reference to FIG. 11 through FIG. 13.

Figure 13:
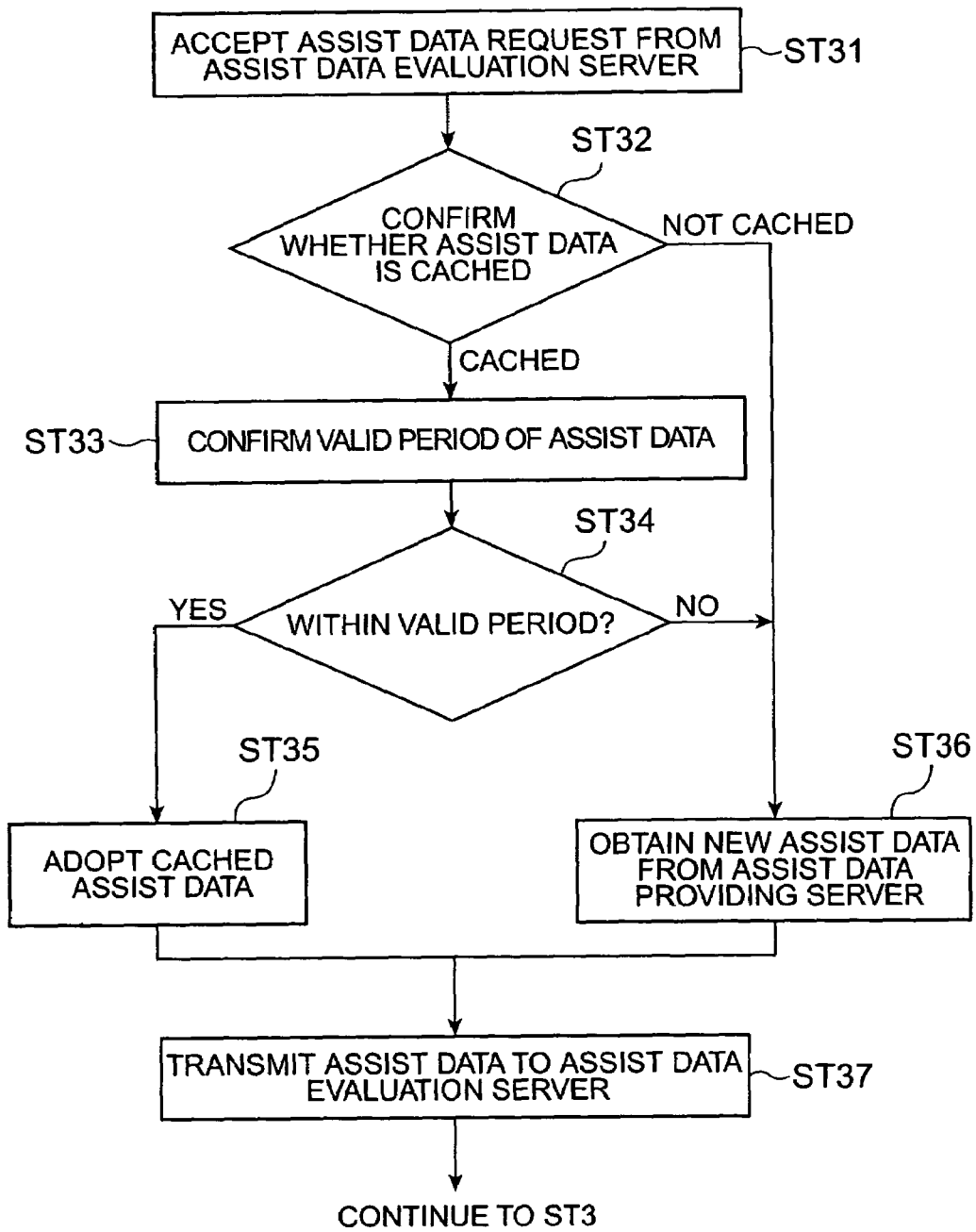
FIG. 13 is a view of a flowchart detailing an example of operations of the relay server.

FIG. 13 is a view of a flowchart detailing an example of operations of the relay server 210. Initially, in Step ST31, the request accepting portion 216 shown in FIG. 12 accepts a request for the assist data 222 from the assist data evaluation server 200 within the RNC 230.

In the subsequent Step ST32, the cache confirming portion 212 confirms whether the assist data 222 have been already stored in the assist data cache portion 215. When the assist data 222 are stored because the already obtained assist data 222 have been stored in the assist data cache portion 215, it means that the assist data 222 have been already obtained from the assist data providing server 220. When the assist data 222 are not stored, it means that the assist data 222 have not been obtained from the assist data providing server 220. When it is confirmed in Step ST32 that the assist data 222 are not stored in the assist data cache portion 215, the flow proceeds to Step ST36 described below. Alternatively, when it is confirmed in Step ST32 that the assist data 222 are stored in the assist data cache portion 215, the flow proceeds to Step ST33.

In Step ST33, when the assist data 222 are stored in the assist data cache portion 215, the valid period confirming portion 213 confirms the valid period of the assist data 222. To be more specific, the valid period managing table 214 manages the obtainment time and the valid period for each piece of the assist data 222, and the valid period confirming portion 213 confirms whether the obtainment time of the assist data 222 is within its valid period for each piece of the assist data 222.

When the obtainment time is judged as being within the valid period in Step ST34, the flow proceeds to Step ST35, and when the obtainment time is judged as being past the valid period, the flow proceeds to Step ST36. In Step ST36, the valid period confirming portion 213 shown in FIG. 12 makes a request for the assist data 222 to the assist data providing server 220 by controlling the assist data requesting portion 216, and obtains new assist data 222. Otherwise, in Step ST35, the assist data 222 already stored in the assist data cache portion 215 are adopted and transmitted to the assist data evaluation server 200 by the assist data transmitting portion 217 (Step ST37).

According to the second embodiment of the invention, substantially the same advantages as those in the first embodiment can be achieved. Moreover, since the valid period confirming portion 213, the valid period managing table 214, the assist data transmitting portion 217, etc. are provided, when the obtainment time of the assist data 222 that match with the request from the assist data evaluation server 200 is within the valid period, it is possible to reduce the burden of a traffic volume for information exchange because the relay server 210 does not have to communicate with the assist data evaluation server 200 in transmitting the assist data 222, and the communications costs can be reduced by a reduction in information volume.

The invention is not limited to the embodiments above, and can be modified in various manners without deviating from the scope of appended claims. For example, respective configurations in the embodiments can be omitted partly, or combined arbitrarily in a different manner.

In addition, it is clear from this disclosure that the assist data evaluation server 200 in the embodiments above can also function as the assist data providing server 220.

A program to cause the acquisition assist information managing systems 1 and 1a to operate by exerting their respective acquisition assist information managing functions is not limited to a form run by being installed in electronic equipment, such as a computer, as has been described above, and it may in a form distributed by being stored in information recording media, such as a flexible disc, a CD (Compact Disc, a trademark), a CD-R (Compact Disc-Recordable), a CD-RW (Compact Disc-ReWritable), a DVD (Digital Versatile Disc), a DVD-R (Digital Versatile Disc-Recordable), and a DVD-RAM (Digital Versatile Disc-Random Access Memory).

It is clear from this disclosure that the program to cause the acquisition assist information managing function to be exerted is not limited to a form stored in the information recording medium, and may be in a form to be downloaded into electronic equipment, such as a user's computer, by way of a transmission medium, such as a network, that enables data communications either by radio waves or via cables.

Further, it goes without saying that the program to cause the acquisition assist information managing function to be exerted may be in a form to be run after it is downloaded from the ASP (Application Service Provider), which lends application software for a certain period in response to a request.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-013197. The entire disclosure of Japanese Patent Application Nos. 2004-013197 and 2005-009953 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. An acquisition assist information managing system comprising:

user equipment being configured to perform positioning by acquiring a satellite being configured to output satellite radio waves including a plurality of items of information, said user equipment being configured to acquire said satellite by acquisition assist information, said user equipment being configured to receive said satellite radio waves from said acquired satellite;

an acquisition assist information providing server being configured to provide said acquisition assist information;

an acquisition assist information evaluation server being configured to evaluate said acquisition assist information between said acquisition assist information providing server and said user equipment;

an acquisition assist information requesting device being arranged in said user equipment to make a request for said acquisition assist information to said acquisition assist information evaluation server by setting a numerical target related to positioning;

an acquisition assist information request accepting device being arranged in said acquisition assist information evaluation server to accept said request for said acquisition assist information from said user equipment;

an acquisition assist information obtaining device being arranged in said acquisition assist information evaluation server to make a request for said acquisition assist information to said acquisition assist information providing server to obtain said acquisition assist information including said plurality of items of information from said acquisition assist information providing server;

a combination generating device being arranged in said acquisition assist information evaluation server to generate combinations of respective items of information included in said obtained acquisition assist information;

a test positioning device being arranged in said acquisition assist information evaluation server to perform test positioning by repetitively acquiring said satellite by using said combinations of respective items of information;

an evaluation information generating device being arranged in said acquisition assist information evaluation server to generate evaluation information by evaluating respective results of test positioning performed by acquiring said satellite by using said combinations of respective items of information;

a combination specifying device being arranged in said acquisition assist information evaluation server to specify on the basis of said evaluation information a combination of respective items of information being configured to reach said numerical target related to positioning from said user equipment;

an acquisition assist information providing device being arranged in said acquisition assist information evaluation server to provide said user equipment with said acquisition assist information including said specified combination of respective items of information; and a relay server being configured to relay said acquisition assist information between said acquisition assist information providing server and said acquisition assist information evaluation server, said relay server includes a valid period managing device being configured to manage a valid period during which said acquisition assist information is valid to assist acquisition of said satellite for each piece of said acquisition assist information, a request accepting device being configured to accept said request for said acquisition assist information from said acquisition assist information evaluation server, an acquisition assist information storage device being configured to store said obtained acquisition assist information when said acquisition assist information that having been obtained from said acquisition assist information providing server is present, a valid period confirming device being configured to confirm whether an obtainment time of said acquisition assist information matching with said request from said acquisition assist information evaluation server is within the valid period of said acquisition assist information, and an acquisition assist information transmitting device being configured to transmit to said acquisition assist information evaluation server said obtained acquisition assist information stored in said acquisition assist information storage device when obtainment time of said acquisition assist information is judged as being within said valid period, and new acquisition assist information obtained from said acquisition assist information providing server when obtainment time of said acquisition assist information is judged as being outside said valid period.

2. The acquisition assist information managing system according to claim 1, wherein
    a plurality of acquisition assist information evaluation servers is provided, and
    said relay server includes a request integrating device to integrate requests for said acquisition assist information from said plurality of acquisition assist information evaluation servers.

3. The acquisition assist information managing system according to claim 2, wherein
    said evaluation information generating device gives scores as said evaluation information to respective results of test positioning on the basis of respective combinations of said plurality of items of information included in said acquisition assist information.

4. The acquisition assist information managing system according to claim 3, wherein
    said plurality of items of information included in said acquisition assist information are different kinds of information.

5. The acquisition assist information managing system according to claim 4, wherein
    said user equipment is configured to request time needed to complete positioning, positioning accuracy, and/or a communication volume of said acquisition assist information, either solely or in combination, as said numerical target related to positioning.

6. The acquisition assist information managing system according to claim 5, wherein
    said acquisition assist information evaluation server is installed in a base station through which said user equipment makes data communications.

7. The acquisition assist information managing system according to claim 6, wherein
    said user equipment is a mobile phone.

8. The acquisition assist information managing system according to claim 1, wherein
    said evaluation information generating device gives scores as said evaluation information to respective results of test positioning on the basis of respective combinations of said plurality of items of information included in said acquisition assist information.

9. The acquisition assist information managing system according to claim 1, wherein
    said plurality of items of information included in said acquisition assist information are different kinds of information.

10. The acquisition assist information managing system according to claim 1, wherein
    said user equipment is configured to request time needed to complete positioning, positioning accuracy, and/or a communication volume of said acquisition assist information, either solely or in combination, as said numerical target related to positioning.

11. The acquisition assist information managing system according to claim 1, wherein
    said acquisition assist information evaluation server is installed in a base station through which said user equipment makes data communications.

12. The acquisition assist information managing system according to claim 1, wherein
    said user equipment is a mobile phone.

13. An acquisition assist information managing device comprising:
    an acquisition assist information request accepting device being configured to accept a request for acquisition assist information from user equipment making a request for said acquisition assist information to said acquisition assist information evaluation server by setting a numerical target related to positioning of said user equipment, said acquisition assist information being provided by an acquisition assist information providing server, said acquisition assist information being configured to assist acquisition of a satellite being configured to output satellite radio waves;
    an acquisition assist information obtaining device being configured to make a request for said acquisition assist information to said acquisition assist information providing server to obtain said acquisition assist information including a plurality of items of information from said acquisition assist information providing server;
    a combination generating device being configured to generate combinations of respective items of information included in said obtained acquisition assist information;
    a test positioning device being configured to perform test positioning by repetitively acquiring said satellite by using said combinations of respective items of information;
    an evaluation information generating device being configured to generate evaluation information by evaluating respective results of test positioning performed by acquiring said satellite using of said combinations of respective items of information;
    a combination specifying device being configured to specify on the basis of said evaluation information a combination of respective items of information being configured to reach said numerical target related to positioning from said user equipment;
    an acquisition assist information providing device being configured to provide said user equipment with said acquisition assist information including said specified combination of respective items of information; and
    a relay server being configured to relay said acquisition assist information between said acquisition assist information providing server and said acquisition assist information evaluation server, said relay server includes
        a valid period managing device being configured to manage a valid period during which said acquisition assist information is valid to assist acquisition of said satellite for each piece of said acquisition assist information,
        a request accepting device being configured to accept said request for said acquisition assist information from said acquisition assist information evaluation server,
        an acquisition assist information storage device being configured to store said obtained acquisition assist information when said acquisition assist information having been obtained from said acquisition assist information providing server is present,
        a valid period confirming device being configured to confirm whether an obtainment time of said acquisition assist information matching with said request from said acquisition assist information evaluation server is within the valid period of said acquisition assist information, and
        an acquisition assist information transmitting device being configured to transmit to said acquisition assist information evaluation server said obtained acquisition assist information stored in said acquisition assist information storage device when obtainment time of said acquisition assist information is judged as being within said valid period, and new acquisition assist information obtained from said acquisition assist information providing server when obtainment time of said acquisition assist information is judged as being outside said valid period.

14. An acquisition assist information managing method comprising:
  accepting a request for acquisition assist information from user equipment making a request for said acquisition assist information to an acquisition assist information evaluation server by setting a numerical target related to positioning, said acquisition assist information being provided by said acquisition assist information providing server, said acquisition assist information being configured to assist acquisition of a satellite being configured to output satellite radio waves;
  making a request for said acquisition assist information to said acquisition assist information providing server to obtain said acquisition assist information including a plurality of items of information from said acquisition assist information providing server;
  generating combinations of respective items of information included in said obtained acquisition assist information;
  performing test positioning by repetitively acquiring said satellite using said combinations of respective items of information;
  generating evaluation information by evaluating respective results of test positioning performed by acquiring said satellite using of said combinations of respective items of information;
  specifying on the basis of said evaluation information a combination of respective items of information being configured to reach said numerical target related to positioning from said user equipment; and
  providing said user equipment with said acquisition assist information including said specified combination of respective items of information; and
  relaying said acquisition assist information between said acquisition assist information providing server and said acquisition assist information evaluation server via a relay server having
    a valid period managing device being configured to manage a valid period during which said acquisition assist information is valid to assist acquisition of said satellite for each piece of said acquisition assist information,
    a request accepting device being configured to accept said request for said acquisition assist information from said acquisition assist information evaluation server,
    an acquisition assist information storage device being configured to store said obtained acquisition assist information when said acquisition assist information having been obtained from said acquisition assist information providing server is present,
    a valid period confirming device being configured to confirm whether an obtainment time of said acquisition assist information matching with said request from said acquisition assist information evaluation server is within the valid period of said acquisition assist information, and
    an acquisition assist information transmitting device being configured to transmit to said acquisition assist information evaluation server said obtained acquisition assist information stored in said acquisition assist information storage device when obtainment time of said acquisition assist information is judged as being within said valid period and new acquisition assist information obtained from said acquisition assist information providing server when obtainment time of said acquisition assist information is judged as being outside said valid period.

* * * * *